(12) United States Patent
Kaneko et al.

(10) Patent No.: US 11,165,080 B2
(45) Date of Patent: Nov. 2, 2021

(54) FUEL CELL SYSTEM

(71) Applicant: TOYOTA JIDOSHA KABUSHIKI KAISHA, Toyota (JP)

(72) Inventors: Tomohiko Kaneko, Okazaki (JP); Masayuki Ito, Sunto-gun (JP); Hideyuki Kumei, Sunto-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 5 days.

(21) Appl. No.: 16/752,904

(22) Filed: Jan. 27, 2020

(65) Prior Publication Data

US 2020/0251761 A1  Aug. 6, 2020

(30) Foreign Application Priority Data

Jan. 31, 2019  (JP) .............................. JP2019-016052

(51) Int. Cl.
*H01M 8/04858* (2016.01)
*H01M 8/0438* (2016.01)

(52) U.S. Cl.
CPC ..... *H01M 8/04873* (2013.01); *H01M 8/0441* (2013.01); *H01M 8/04932* (2013.01)

(58) Field of Classification Search
CPC ........... H01M 8/04873; H01M 8/0441; H01M 8/04932
See application file for complete search history.

(56) References Cited

U.S. PATENT DOCUMENTS

2016/0141675 A1\* 5/2016 Kaneko ............. H01M 8/04559
429/432

FOREIGN PATENT DOCUMENTS

| JP | 2008-124179 | 5/2008 |
| JP | 2008-130402 | 6/2008 |
| JP | 2012-185968 | 9/2012 |

\* cited by examiner

*Primary Examiner* — Olatunji A Godo
(74) *Attorney, Agent, or Firm* — Finnegan, Henderson, Farabow, Garrett & Dunner, LLP

(57) ABSTRACT

A fuel cell system includes a fuel cell, a supply device configured to supply a cathode gas to the fuel cell; and a control unit configured to execute recovery processing of causing a catalyst of the fuel cell to recover from performance deterioration by lowering an output voltage of the fuel cell. The control unit is configured to, when the recovery processing that has been executed is completed, control the supply device to place the fuel cell in a power generation paused state while making a stoichiometric ratio of the cathode gas lower than a stoichiometric ratio of the cathode gas in a normal operation state that is a state before execution of the recovery processing.

9 Claims, 12 Drawing Sheets

FUEL CELL SYSTEM

INCORPORATION BY REFERENCE

The disclosure of Japanese Patent Application No. 2019-016052 filed on Jan. 31, 2019 including the specification, drawings and abstract is incorporated herein by reference in its entirety.

BACKGROUND

1. Technical Field

The present disclosure relates to a fuel cell system.

2. Description of Related Art

Recovery processing is known that lowers a voltage of a fuel cell so as to remove poisonous substances and oxide films adhering to a catalyst of the fuel cell, thereby causing the catalyst to recover from performance deterioration (for example, see Japanese Unexamined Patent Application Publication No. 2008-130402 (JP 2008-130402 A)).

SUMMARY

When the voltage of the fuel cell is controlled to be high immediately after the recovery processing is completed as in JP 2008-130402 A, the catalyst of the fuel cell is exposed to a high potential and may be eluted.

The present disclosure provides a fuel cell system that suppresses elution of a catalyst of a fuel cell.

According to a first aspect, provided is a fuel cell system. The fuel cell system includes: a fuel cell; a supply device configured to supply a cathode gas to the fuel cell; and a control unit configured to execute recovery processing of causing a catalyst of the fuel cell to recover from performance deterioration by lowering an output voltage of the fuel cell. The control unit is configured to, when the recovery processing that has been executed is completed, control the supply device to place the fuel cell in a power generation paused state while making a stoichiometric ratio of the cathode gas lower than a stoichiometric ratio of the cathode gas in a normal operation state that is a state before execution of the recovery processing.

According to the above aspect, it is possible to suppress the voltage of the fuel cell of which the recovery processing has just been completed from becoming high. Thus, it is possible to suppress the elution of the catalyst.

In the fuel cell system in the above aspect, the control unit may be configured to control the supply device to make an open circuit voltage of the fuel cell in the power generation paused state lower than an output voltage of the fuel cell in an idle operation state in the normal operation state.

In the fuel cell system in the above aspect, the control unit may be configured to control the supply device to regulate a flow rate of the cathode gas to be supplied to the fuel cell such that the open circuit voltage of the fuel cell is kept within a predetermined target range.

In the fuel cell system in the above aspect, the fuel cell may include a plurality of single cells that are stacked. The control unit may be configured to control the supply device to control an open circuit voltage of the fuel cell in the power generation paused state such that an average cell voltage is equal to or lower than 0.9 V.

In the fuel cell system in the above aspect, the control unit may be configured to, i) place the fuel cell in the power generation paused state while making the stoichiometric ratio of the cathode gas lower than the stoichiometric ratio of the cathode gas in the normal operation state, when a request output to the fuel cell at a time when the recovery processing is completed is less than a first threshold value, and ii) place the fuel cell in an idle operation state while making a stoichiometric ratio of the cathode gas lower than the stoichiometric ratio of the cathode gas in the normal operation state, when the request output at the time when the recovery processing is completed is equal to or greater than the first threshold value and less than a second threshold value that is greater than the first threshold value.

The fuel cell system in the above aspect, may further include a secondary battery. The control unit may be configured to place the fuel cell in the power generation paused state and control an output of the secondary battery such that the secondary battery outputs electric power in an amount corresponding to the request output to the fuel cell, when the secondary battery is able to output electric power in the amount corresponding to the request output to the fuel cell at a time when the recovery processing is completed.

In the fuel cell system in the above aspect, the fuel cell system may include a plurality of the fuel cells. The supply device may be configured to supply the cathode gas to the plurality of the fuel cells. The control unit may be configured to, when electric power in an amount corresponding to a request total output to the plurality of the fuel cells at a time when the recovery processing for one fuel cell among the plurality of the fuel cells is completed is able to be output from the rest of the plurality of the fuel cells, place the one fuel cell for which the recovery processing has just been completed in the power generation paused state, and control an output of the rest of the plurality of the fuel cells such that the rest of the plurality of the fuel cells outputs electric power in the amount corresponding to the request total output to the plurality of the fuel cells.

In the fuel cell system in the above aspect, the fuel cell system may include a plurality of the fuel cells. The supply device may be configured to supply the cathode gas to the plurality of the fuel cells. The control unit is configured to, when electric power in an amount corresponding to a request total output to the plurality of the fuel cells at a time when the recovery processing of all of the plurality of the fuel cells is completed is able to be output from the plurality of the fuel cells other than a lowest-output-performance fuel cell that is included in the plurality of the fuel cells and that has lowest output performance among the plurality of the fuel cells, place the lowest-output-performance fuel cell in the power generation paused state, and control an output of the plurality of the fuel cells other than the lowest-output-performance fuel cell such that the plurality of the fuel cells other than the lowest-output-performance fuel cell outputs electric power in the amount corresponding to the request total output to the plurality of the fuel cells.

According to a second aspect, provided is a fuel cell system. The fuel cell system includes a fuel cell, a supply device configured to supply a cathode gas to the fuel cell, and a control unit configured to execute recovery processing of causing a catalyst of the fuel cell to recover from performance deterioration by lowering an output voltage of the fuel cell. The control unit is configured to, when the recovery processing that has been executed is completed, control the supply device to place the fuel cell in an idle operation state while making a stoichiometric ratio of the cathode gas lower than a stoichiometric ratio of the cathode gas in a normal operation state that is a state before execution of the recovery processing.

According to the above aspect, it is possible to suppress the voltage of the fuel cell of which the recovery processing has just been completed from becoming high. Thus, it is possible to suppress the elution of the catalyst.

According to the present disclosure, it is possible to provide a fuel cell system that suppresses elution of a catalyst of a fuel cell.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Configuration of Fuel Cell System

Figure 1:
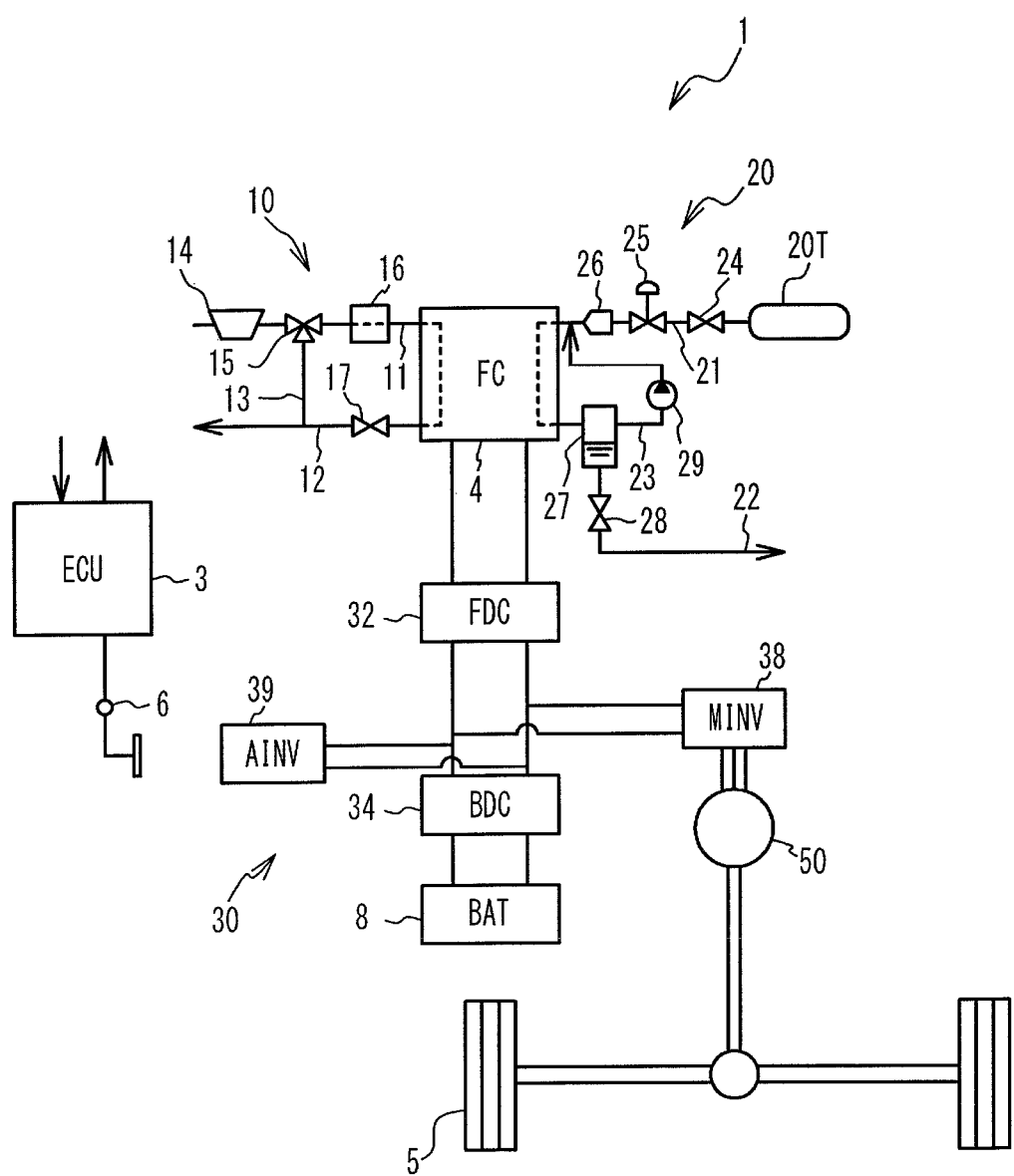
FIG. 1 is a configuration diagram of a fuel cell system mounted in a vehicle.

FIG. 1 is a configuration diagram of a fuel cell system 1 mounted in a vehicle. The fuel cell system 1 includes an electronic control unit (ECU) 3, a fuel cell (hereinafter referred to as an FC) 4, a secondary battery (hereinafter referred to as a BAT) 8, a cathode gas supply system 10, an anode gas supply system 20, and a power control system 30. The fuel cell system 1 includes a cooling system (not shown) that cools the FC 4 by circulating cooling water. Further, the vehicle includes a motor 50 for traveling, wheels 5, and an accelerator opening sensor 6. The FC 4 is a fuel cell generating electricity by receiving supply of a cathode gas and an anode gas, and is configured by stacking a plurality of solid polymer electrolyte type single cells.

The cathode gas supply system 10 (supply device) supplies air containing oxygen as the cathode gas to the FC 4, and includes: a supply pipe 11; a discharge pipe 12; a bypass pipe 13; an air compressor 14 (compressor); a bypass valve 15; an intercooler 16; and a back pressure valve 17. The supply pipe 11 is connected to a cathode inlet manifold of the FC 4. The discharge pipe 12 is connected to a cathode outlet manifold of the FC 4. The bypass pipe 13 communicates the supply pipe 11 and the discharge pipe 12 with each other. The bypass valve 15 is provided at a connection part between the supply pipe 11 and the bypass pipe 13. The bypass valve 15 switches a communication state between the supply pipe 11 and the bypass pipe 13. The air compressor 14, the bypass valve 15, and the intercooler 16 are arranged on the supply pipe 11 in this order from the upstream side. The back pressure valve 17 is disposed on the discharge pipe 12 and located more upstream than the connection part between the discharge pipe 12 and the bypass pipe 13. The air compressor 14 supplies air containing oxygen as the cathode gas to the FC 4 via the supply pipe 11. The cathode gas supplied to the FC 4 is discharged through the discharge pipe 12. The intercooler 16 cools the cathode gas to be supplied to the FC 4. The back pressure valve 17 adjusts a back pressure on the cathode side of the FC 4. Driving of each of the air compressor 14, the bypass valve 15, and the back pressure valve 17 is controlled by the ECU 3.

In a normal operation state of the FC 4, the cathode gas from the air compressor 14 is controlled to be in a supply state in which the cathode gas is supplied to the FC 4 by adjusting opening degrees of the bypass valve 15 and the back pressure valve 17. In the supply state, the bypass valve 15 communicates at least the upstream side and the downstream side of the supply pipe 11 from the bypass valve 15, and the back pressure valve 17 adjusts at least the discharge pipe 12 to be in an open state excluding a fully closed state. In addition, as will be described in detail later, in a state in which power generation of the FC 4 is paused, the cathode gas is controlled to be in a bypass state of bypassing the FC 4, by using the bypass valve 15 and the back pressure valve 17, so as not to be supplied to the FC 4 but to be discharged to the outside. In the bypass state, the back pressure valve 17 fully closes the discharge pipe 12, and the bypass valve 15 communicates the upstream side of the supply pipe 11 from the bypass valve 15 and the bypass pipe 13 with each other while blocking the upstream side and the downstream side of the supply pipe 11 from the bypass valve 15.

The anode gas supply system 20 supplies hydrogen gas as the anode gas to the FC 4, and includes: a tank 20T; a supply pipe 21; a discharge pipe 22; a circulation pipe 23; a tank valve 24; a pressure regulating valve 25; an injector (hereinafter, referred to as an INJ) 26; a gas-liquid separator 27; a drain valve 28; and a hydrogen circulation pump (hereinafter, referred to as an HP) 29. The tank 20T and an anode inlet manifold of the FC 4 are connected by a supply pipe 21. The tank 20T stores hydrogen gas that is the anode gas. The discharge pipe 22 is connected to an anode outlet manifold of the FC 4. The circulation pipe 23 communicates the gas-liquid separator 27 and the supply pipe 21 with each other. The tank valve 24, the pressure regulating valve 25, and the INJ 26 are arranged in this order from the upstream side of the supply pipe 21. With the tank valve 24 open, the opening degree of the pressure regulating valve 25 is adjusted, and the INJ 26 injects the anode gas. Thereby, the anode gas is supplied to the FC 4. The gas-liquid separator 27 and the drain valve 28 are disposed on the discharge pipe 22 in this order from the upstream side. The gas-liquid separator 27 separates moisture from the anode gas discharged from the FC 4 and stores this moisture. The water stored in the gas-liquid separator 27 is discharged to the outside of the fuel cell system 1 through the discharge pipe 22 when the drain valve 28 is opened. The circulation pipe 23 is a pipe for refluxing the anode gas to the FC 4, an upstream end of the circulation pipe 23 is connected to the gas-liquid separator 27, and the circulation pipe 23 is provided with an HP 29. The anode gas discharged from the FC 4 is appropriately pressurized by the HP 29 to be guided to the supply pipe 21. Driving of the tank valve 24, the pressure regulating valve 25, the INJ 26, the drain valve 28, and the HP 29 is controlled by the ECU 3.

The power control system 30 controls discharge of the FC 4 and charge-discharge of the BAT 8. The power control system 30 includes: a fuel cell DC-DC converter (hereinafter, referred to as an FDC) 32; a battery DC-DC converter (hereinafter, referred to as a BDC) 34; a motor inverter (hereinafter, referred to as an MINV) 38; and an auxiliary inverter (hereinafter, referred to as an AINV) 39. The FDC 32 controls output current of the FC 4 based on a request current value transmitted from the ECU 3, and also adjusts direct-current power from the FC 4 and outputs this to the MINV 38 and the AINV 39. The BDC 34 adjusts direct-current power from the BAT 8 and outputs this to the MINV 38 and the AINV 39. The power generated by the FC 4 can be stored in the BAT 8. The MINV 38 converts the input direct-current power into three-phase AC power and supplies this to the motor 50. The motor 50 drives the wheels 5 to drive the vehicle. The motor 50 functions as a power generator that generates electricity based on kinetic energy input from the wheels 5 when the vehicle is decelerated or runs down on a slope. The power of the FC 4 and the BAT 8 can be supplied to a load device other than the motor 50 via the AINV 39. Here, the load device includes, in addition to the motor 50, auxiliary equipment for the FC 4 and auxiliary equipment for the vehicle. The auxiliary equipment for the FC 4 includes: the air compressor 14; the bypass valve 15; the back pressure valve 17; the tank valve 24; the pressure regulating valve 25; the INJ 26; the drain valve 28; and the HP 29, which are all described above. The auxiliary equipment for the vehicle includes: air conditioning equipment, a lighting device, hazard lamps, etc., for example.

The ECU 3 includes a central processing unit (CPU), a read only memory (ROM), and a random access memory (RAM). The ECU 3 is electrically connected to the accelerator opening sensor 6, the air compressor 14, the bypass valve 15, the back pressure valve 17, the tank valve 24, the pressure regulating valve 25, the INJ 26, the drain valve 28, the HP 29, the FDC 32, and the BDC 34. The ECU 3 calculates a request output to the FC 4, that is, an amount of electric power that the FC 4 is requested to output, based on the detection value of the accelerator opening sensor 6, the driving states of the auxiliary equipment for the vehicle and the auxiliary equipment for the FC 4, the stored power of the BAT 8, etc. Further, the ECU 3 calculates a target current value of the FC 4 according to the request output to the FC 4. The ECU 3 controls the FDC 32 while controlling the air compressor 14 and the INJ 26 to control the flow rate of the cathode gas and the flow rate of the anode gas supplied to the FC 4 to the flow rates corresponding to the target current value so as to control a sweep current value of the FC 4 to the target current value. The ECU 3 is an example of a control unit that executes recovery processing described later.

IV Characteristics

The ECU 3 can change current-voltage characteristics (hereinafter referred to as IV characteristics) of the FC 4 by controlling a stoichiometric ratio of the cathode gas supplied to the FC 4. Specifically, a cathode stoichiometric ratio can be changed by changing the flow rate of the cathode gas supplied to the FC 4, and as a result, the IV characteristics of the FC 4 can be changed. The "stoichiometric ratio" indicates a ratio of an amount of a reactive gas to be supplied relative to a theoretical amount of a reactive gas based on the requested power generation amount. In the normal operation state, the flow rates of the cathode gas and the anode gas are adjusted so that both the cathode stoichiometric ratio and the anode stoichiometric ratio are sufficiently high, and power generation is performed with high efficiency. The flow rate of the anode gas is controlled to maintain the anode stoichiometric ratio at a sufficiently high level regardless of the magnitude of the cathode stoichiometric ratio so as not to cause so-called hydrogen shortage.

Figure 2:
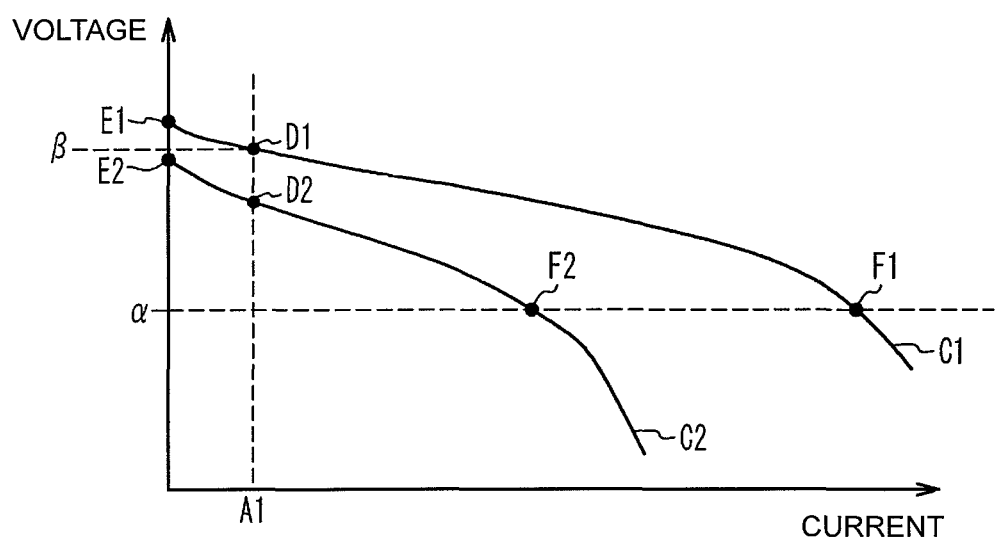
FIG. 2 is a graph showing a normal IV curve and a low IV curve of the fuel cell.

FIG. 2 is a graph showing a normal IV curve C1 and a low IV curve C2 of the FC 4. The normal IV curve C1 is an IV curve in a state where the cathode stoichiometric ratio and the anode stoichiometric ratio are sufficiently high, and shows the IV characteristics of the FC 4 in the normal operation state. The low IV curve C2 indicates the IV characteristics of the FC 4 in which only the cathode stoichiometric ratio is lower than that in the normal operation state, and indicates the IV characteristics in which the power generation efficiency is lower than that in the normal operation state. In addition, FIG. 2 shows operating points D1, D2, E1, E2, F1, and F2, a target value α, a voltage value β, and a target idle current value A1. The operating points D1, E1, and F1 indicate operating points on the normal IV curve C1, and the operating points D2, E2, and F2 indicate operating points on the low IV curve C2. The target value α is a target voltage value for the recovery processing described later in detail, and is also a voltage value at the operating points F1 and F2. The operating points E1 and E2 are operating points at which the current is zero on the normal IV curve C1 and the low IV curve C2, respectively. The target idle current value A1 is a target current value when the FC 4 is controlled to be in an idle operation state. The voltage value β is a voltage at the operating point D1 on the normal IV curve C1, that is, a voltage value when the FC 4 is controlled to be in the idle operation state in the normal operation state. The idle operation state is a state, for example, in which the vehicle is temporarily stopped, and the FC 4 generates power equivalent to power consumed by the auxiliary equipment for the FC 4, which is minimum necessary to continue the power generation of the FC 4, with a predetermined margin.

Recovery Processing

The ECU 3 executes the recovery processing of causing the catalyst of the FC 4 to recover from performance deterioration. Specifically, the output voltage of the FC 4 is lowered to a target value that is a voltage value at which an electrode catalyst of the FC 4 undergoes a reduction reaction so as to remove poisonous substances and oxide films adhering to the catalyst of the FC 4, so that the catalyst recovers from performance deterioration. By executing the recovery processing, the power generation performance of the FC 4 can be recovered. When there is an execution request for the recovery processing and the FC 4 is in a predetermined operation state, the recovery processing is executed. It is determined that there is the execution request for the recovery processing, when any of the following conditions is satisfied, for example: when the voltage value at a predetermined current density of the FC 4 is smaller than a threshold value; when an elapsed time from the execution of the previous recovery processing is a predetermined time or longer; when a cumulative operation time of the FC 4 from the execution of the previous recovery processing is a predetermined time or longer; or when a vehicle travel distance from the execution of the previous recovery processing is a predetermined distance or more.

The recovery processing is executed as follows, for example. The FC 4 is controlled so that, in the normal operation state, the operating point D1 at which the FC 4 is in the idle operation state shifts to the operating point F1 at which the voltage becomes the target value α. The shift from the operating point D1 to the operating point F1 is realized by controlling the FDC 32 so that the flow rates of the cathode gas and the anode gas supplied to the FC 4 are increased while the cathode stoichiometric ratio and the anode stoichiometric ratio are maintained sufficiently high, and the sweep current value from the FC 4 gradually reaches the target current value corresponding to the operating point F1. The recovery processing may be performed by shifting the operating point from the operating point D1 to the operating point F2. In this case, the FDC 32 is controlled such that the flow rate of the cathode gas and the flow rate of the anode gas are increased with the cathode stoichiometric ratio being lower than that in the normal operation state and the anode stoichiometric ratio being sufficiently high and the sweep current value from the FC 4 gradually approaches the target current value corresponding to the operating point F2. In any case, when the voltage value of the FC 4 reaches the target value α, poisonous substances and oxide films adhering to the catalyst are removed, and the recovery processing is completed. The target value α is set so that the average cell voltage is 0.6 V or less, for example.

Control after Completion of Recovery Processing in Comparative Example

Figure 3A:
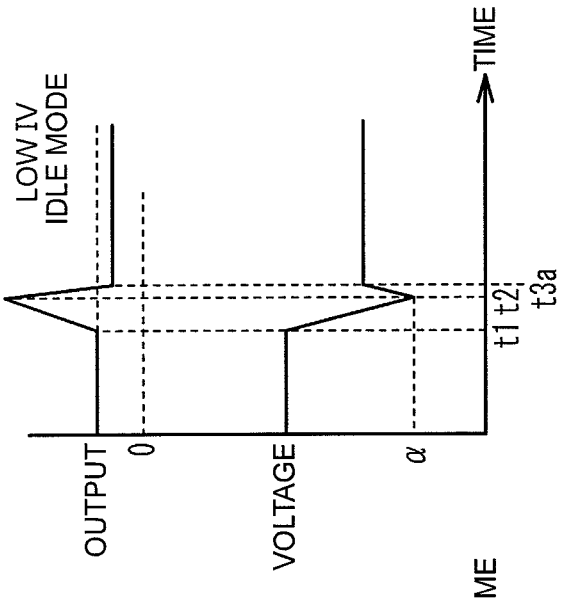
FIG. 3A is a timing chart showing changes in output and voltage of the fuel cell after completion of recovery processing in a comparative example.

FIG. 3A is a timing chart showing changes in output and voltage of the FC 4 after completion of recovery processing in a comparative example. FIG. 3A shows a case where the operating point shifts in the order from D1, F1, to D1. When the recovery processing is started from the operating point D1 (time t1), the output of the FC 4 starts increasing and the voltage of the FC 4 starts decreasing. When the operating point reaches F1 and the voltage reaches the target value α, the recovery processing is completed (time t2). Immediately after the recovery processing is completed, the output of the FC 4 decreases, and the voltage increases and the operating point returns to D1 (time t3x). Thus, when the voltage of the FC 4 is controlled to be high immediately after the completion of the recovery processing, the catalyst of the FC 4 is exposed to a high potential and may be eluted.

Control after Completion of Recovery Processing in Present Embodiment

Figure 3B:
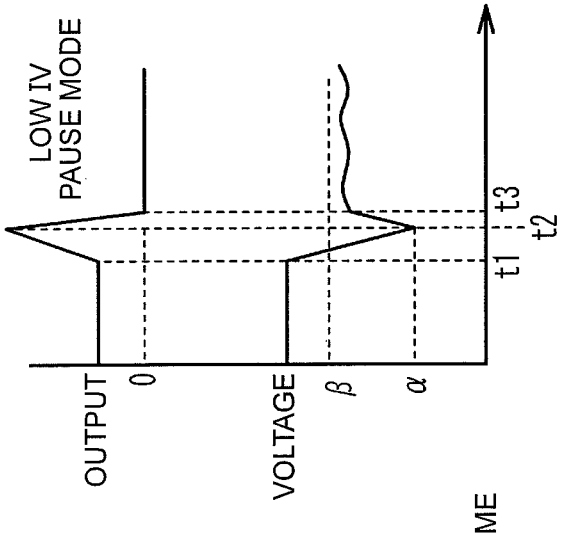
FIG. 3B is a timing chart showing changes in output and voltage of the fuel cell after completion of recovery processing in the present embodiment.
Figure 3C:
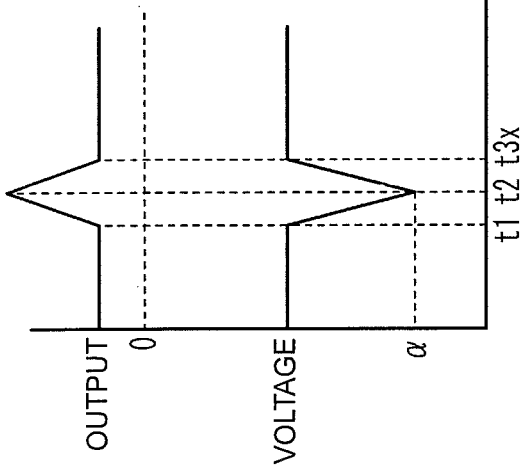
FIG. 3C is a timing chart showing changes in the output and the voltage of the fuel cell after the completion of the recovery processing in the present embodiment.

In the present embodiment, the ECU 3 executes control for suppressing the voltage of the FC 4 from becoming high after the completion of the recovery processing. FIGS. 3B and 3C are timing charts showing changes in the output and the voltage of the FC 4 after the completion of the recovery processing in the present embodiment. In the present embodiment, an operation mode of the FC 4 after the completion of the recovery processing is switched to either: a mode in which the FC 4 is controlled to be in a power generation paused state while the cathode stoichiometric ratio is made lower than that in the normal operation state (hereinafter referred to as a low IV pause mode); and a mode in which the FC 4 is controlled to be in the idle operation state while the cathode stoichiometric ratio is made lower than that in the normal operation state (hereinafter referred to as a low IV idle mode). Specifically, the FC 4 is controlled to be in either the low IV pause mode or the low IV idle mode in accordance with the magnitude of the request output to the FC 4 at the time when the recovery processing is completed. FIG. 3B shows a case where the FC 4 is controlled to be in the low IV pause mode, specifically a case where the operating point shifts in the order from D1, F1, to E2. FIG. 3C shows a case where the FC 4 is controlled to be in the low IV idle mode, specifically, a case where the operating point shifts in the order from D1, F1, to D2. As will be described in detail later, the operation mode of the FC 4 in the normal operation state is referred to as a normal operation mode in contrast to the low IV pause mode and the low IV idle mode.

Low IV Pause Mode

With reference to FIG. 3B, the case where the FC 4 is controlled to be in the low IV pause mode after the completion of the recovery processing will be described. As in the comparative example described above, when the recovery processing is completed (time t2), the operating point shifts to E2 (time t3). Here, the shift of the operating point from F1 to E2 is realized by gradually decreasing the sweep current value from the FC 4 to zero, while gradually decreasing the flow rate of the cathode gas with the cathode stoichiometric ratio kept lower than that in the normal operation state, so as to pause the power generation of the FC 4. Accordingly, it is possible to shift the FC 4 to the power generation paused state with power generation efficiency reduced to be lower than that in the case where the operating point shifts from F1 to E1 on the normal IV curve C1 and the voltage of the FC 4 being low. Thus, the elution of the catalyst can be suppressed. Note that the voltage value at the operating point E2 is a target voltage value at the time when the sweep current value is controlled to zero by controlling the FC 4 in the low IV pause mode. The cathode stoichiometric ratio, that is, the flow rate of the cathode gas is preferably controlled so that the voltage value becomes the target voltage value.

After the operating point reaches E2, that is, when the power generation of the FC 4 is paused, the flow rate of the cathode gas to be supplied to the FC 4 is regulated so that an open circuit voltage of the FC 4 is kept within a predetermined target range. Specifically, when the operating point reaches E2, the flow rate of the cathode gas is controlled to zero, and the open circuit voltage of the FC 4 decreases due to so-called cross leak. When the open circuit voltage of the FC 4 becomes equal to or lower than a lower limit value of the target range, the cathode gas is again supplied to the FC 4 and the open circuit voltage of the FC 4 rises. When the open circuit voltage of the FC 4 becomes equal to or higher than an upper limit value of the target range, the flow rate of the cathode gas supplied to the FC 4 is again controlled to zero. Such an upper limit value of the target range is set to a value lower than the voltage value at the operating point E1 on the normal IV curve C1 described above.

The voltage value at the operating point E2 and the upper limit value of the target range of the open circuit voltage described above are preferably less than the voltage value β at the operating point D1 in the idle operation state in the normal operation state. This is because it is preferable to maintain the voltage of the FC 4 at a low value after the completion of the recovery processing. Furthermore, the voltage value at the operating point E2 and the upper limit value of the target range of the open circuit voltage are such values that the average cell voltage is 0.9 V or less, and preferably such values that the average cell voltage is 0.85 V or less, and more preferably such values that the average cell voltage is 0.8 V or less. The lower the average cell voltage, the more the elution of the catalyst of each single cell can be suppressed.

When the request output to the FC 4 increases after a predetermined period of time has elapsed after the FC 4 is controlled to be in the low IV pause mode, power generation is resumed and the flow rates of the cathode gas and the anode gas are increased so that the FC 4 is controlled to be in the normal operation mode. Here, if the lower limit value of the target range of the open circuit voltage described above is too small, oxygen concentration on the cathode electrode side of the FC 4 becomes too low when the power generation is resumed. Thus, it takes time to increase the oxygen concentration on the cathode electrode side, and response of an actual output of the FC 4 with respect to the request output may be delayed. Therefore, it is preferable to set the lower limit value of the target range of the open circuit voltage to such a value that the response delay of the FC 4 does not occur when the power generation is resumed.

Low IV Idle Mode

Next, a case where the FC 4 is controlled to be in the low IV idle mode after the completion of the recovery processing will be described. When the recovery processing is completed as shown in FIG. 3C (time t2), the operating point shifts to D2 (time t3a). Here, the shift of the operating point from F1 to D2 is realized by gradually decreasing the sweep current value from the FC 4 to the target idle current value A1 while gradually decreasing the flow rate of the cathode gas with the cathode stoichiometric ratio kept lower than that in the normal operation state. It is possible to shift the FC 4 to the idle operation state with the power generation efficiency reduced to be lower than that in the case where the operating point shifts from F1 to D1 on the normal IV curve C1 and the voltage of the FC 4 being low. Thus, the elution of the catalyst of the FC 4 can be suppressed. The voltage value at the operating point D2 is a target voltage value at the time when the FC 4 is controlled to be in the low IV idle mode so that the sweep current value is controlled to the target idle current value A1. The cathode stoichiometric ratio, that is, the flow rate of the cathode gas is preferably controlled so that the voltage value of the FC 4 in the low IV idle mode becomes the target voltage value. The voltage value at the operating point D2 is such a voltage value that the average cell voltage is 0.9 V or less as described above.

If the request output to the FC 4 increases after a predetermined period of time has elapsed while the FC 4 is controlled to be in the low IV idle mode, the flow rates of the cathode gas and the anode gas are increased and the FC 4 is controlled to be in the normal operation mode. Here, if the voltage value of the FC 4 in the low IV idle mode is too small, it takes time to return to the normal stoichiometric ratio in the normal operation state, and the response of the actual output of the FC 4 with respect to the request output may be delayed. Therefore, it is preferable to set the lower limit value of the target range of the voltage in the low IV idle operation state to such a value that the response delay of the FC 4 does not occur when the power generation is resumed.

Note that, both the low IV pause mode and the low IV idle mode are realized by controlling the flow rate of the cathode gas to the FC 4, but the control of the flow rate of the cathode gas is realized by adjusting the opening degrees of the bypass valve 15 and the back pressure valve 17. For example, in order to switch the flow rate of the cathode gas to zero, control is performed to set the communication state to the above-described bypass state while the air compressor 14 is maintained to rotate at a minimum rotation speed. In order to increase the flow rate of the cathode gas, the back pressure valve 17 opens the discharge pipe 12, and the upstream side and the downstream side of the supply pipe 11 from the bypass valve 15 are allowed to communicate with each other by the bypass valve 15. The control on the flow rate of the cathode gas is not limited to this, and for example, in the supply state in which the cathode gas can be supplied to the FC 4, the flow rate of the cathode gas to the FC 4 may be controlled to zero by stopping the driving of the air compressor 14. The target flow rate of the cathode gas, which is set when the open circuit voltage becomes equal to or greater than the upper limit value of the target range, is controlled to zero; however, the present disclosure is not limited to this, and any flow rate may be adopted as far as the open circuit voltage is lowered at this flow rate.

Operation Mode Control of Present Embodiment

Figure 4:
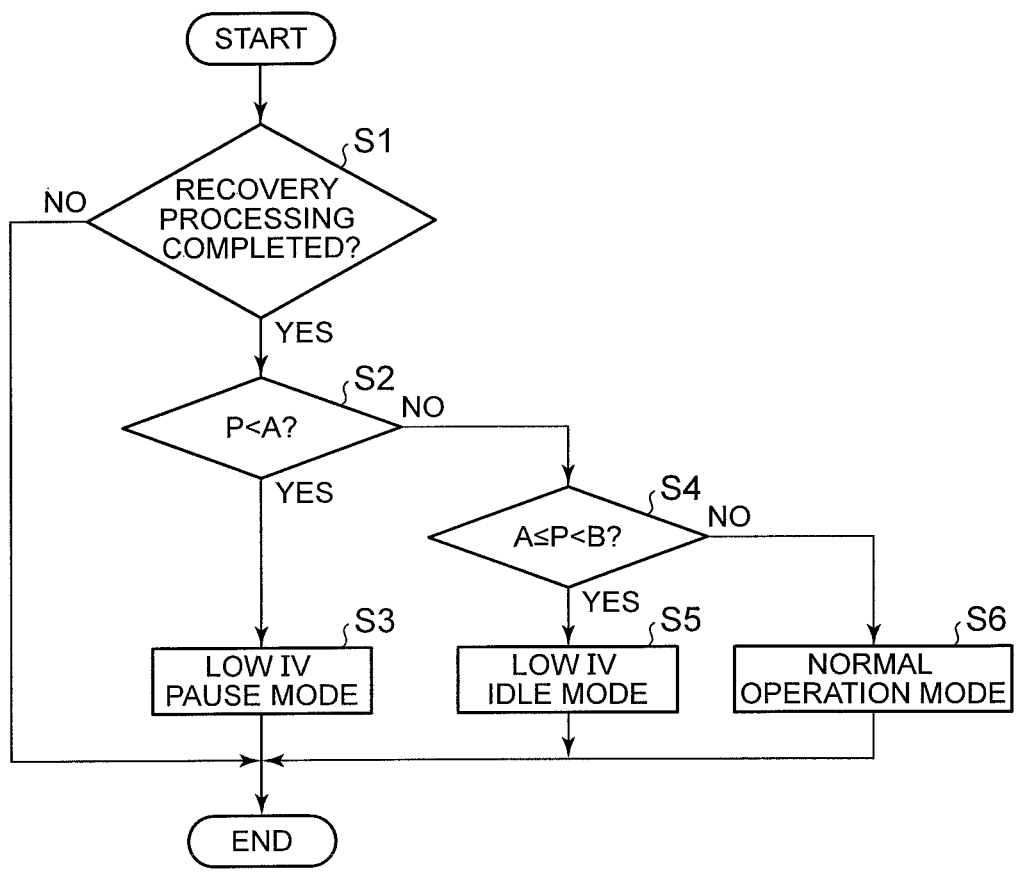
FIG. 4 is a flowchart showing an example of operation mode control of the present embodiment.

Next, the operation mode control after the completion of the recovery processing, which is executed by the ECU 3, will be specifically described. FIG. 4 is a flowchart showing an example of the operation mode control of the present embodiment. This control is repetitively executed. The ECU 3 determines whether or not the recovery processing has been completed (step S1). Specifically, it is determined whether or not the recovery processing is being executed and the output voltage of the FC 4 is equal to or less than the target value α described above. The output voltage of the FC 4 is detected by a voltage sensor (not shown) connected to the FC 4. When the recovery processing is not being executed, or when the recovery processing is being executed but the output voltage of the FC 4 is not equal to or less than the target value α (No in step S1), this control is terminated.

When the recovery processing has been completed (Yes in step S1), the ECU 3 determines whether or not a request output P to the FC 4 is less than a threshold value A (step S2). The case where the request output P is less than the threshold value A is, for example, that the amount of power consumed by the auxiliary equipment for the vehicle is small, the remaining charge of the BAT 8 is sufficient, and the electric power amount that is consumed by the auxiliary equipment for the vehicle can be sufficiently secured by the charging power of the BAT 8. The case is also, for example, that the air conditioner of the vehicle is in a stopped state while the vehicle is in a stopped state, traveling at a reduced speed, traveling on a downhill road, or the like. The threshold value A is an example of a first threshold value.

If the request output P is less than the threshold value A (Yes in step S2), the ECU 3 controls the FC 4 in the low IV pause mode (step S3). Thereby, the elution of the catalyst of the FC 4 can be suppressed.

When the request output P is equal to or greater than the threshold value A (No in step S2), the ECU 3 determines whether or not the request output P is equal to or greater than the threshold value A and less than a threshold value B (step S4). The case where the request output P is equal to or greater than the threshold value A and less than the threshold value B is, for example, that the vehicle is in a stopped state and the electric power consumed by the auxiliary equipment for the vehicle is relatively large. The case where the electric power consumed by the auxiliary equipment for the vehicle is relatively large is, for example, that a difference between a set temperature of the air conditioner of the vehicle and an outside air temperature is large. The threshold value B is an example of a second threshold value.

When the request output P is equal to or greater than the threshold value A and less than the threshold value B (Yes in step S4), the ECU 3 controls the FC 4 in the low IV idle mode (step S5). Thereby, the elution of the catalyst of the FC 4 can be suppressed. If the output of the FC 4 becomes insufficient with respect to the request output P due to the control of the FC 4 to be in the low IV idle mode, the BDC 34 may be controlled so that electric power corresponding to the shortage may be output by the BAT 8.

When the request output P is equal to or greater than the threshold value A and is not less than the threshold value B (No in step S4), that is, when the request output P is equal to or greater than the threshold value B, the ECU 3 controls the FC 4 in the normal operation mode (step S6). The case where the request output P is equal to or greater than the threshold value B is that the vehicle is traveling at an increased speed or traveling on an uphill road. As shown in FIG. 2, the larger the output of the FC 4, the lower the voltage of the FC 4. Therefore, even if the FC 4 is controlled to be in the normal operation mode, the voltage of the FC 4 does not increase to a high voltage and the elution of the catalyst is suppressed.

In step S6, the increase in the voltage of the FC 4 may be suppressed by intentionally increasing the output of the FC 4 to be larger than the request output P. As described above, the larger the output of the FC 4, the lower the voltage of the FC 4. For example, when the request output P is equal to or greater than the threshold value B but less than a threshold value C that is greater than the threshold value B, that is, the FC 4 is controlled to have a relatively low output that is larger than the output in the idle operation state, it is possible to suppress the voltage of the FC 4 from being controlled to be high by intentionally increasing the output of the FC 4 to be larger than the request output P. The BAT 8 may be charged with surplus electric power of the FC 4 generated at this time.

Operation Mode Control of First Modification

Figure 5:
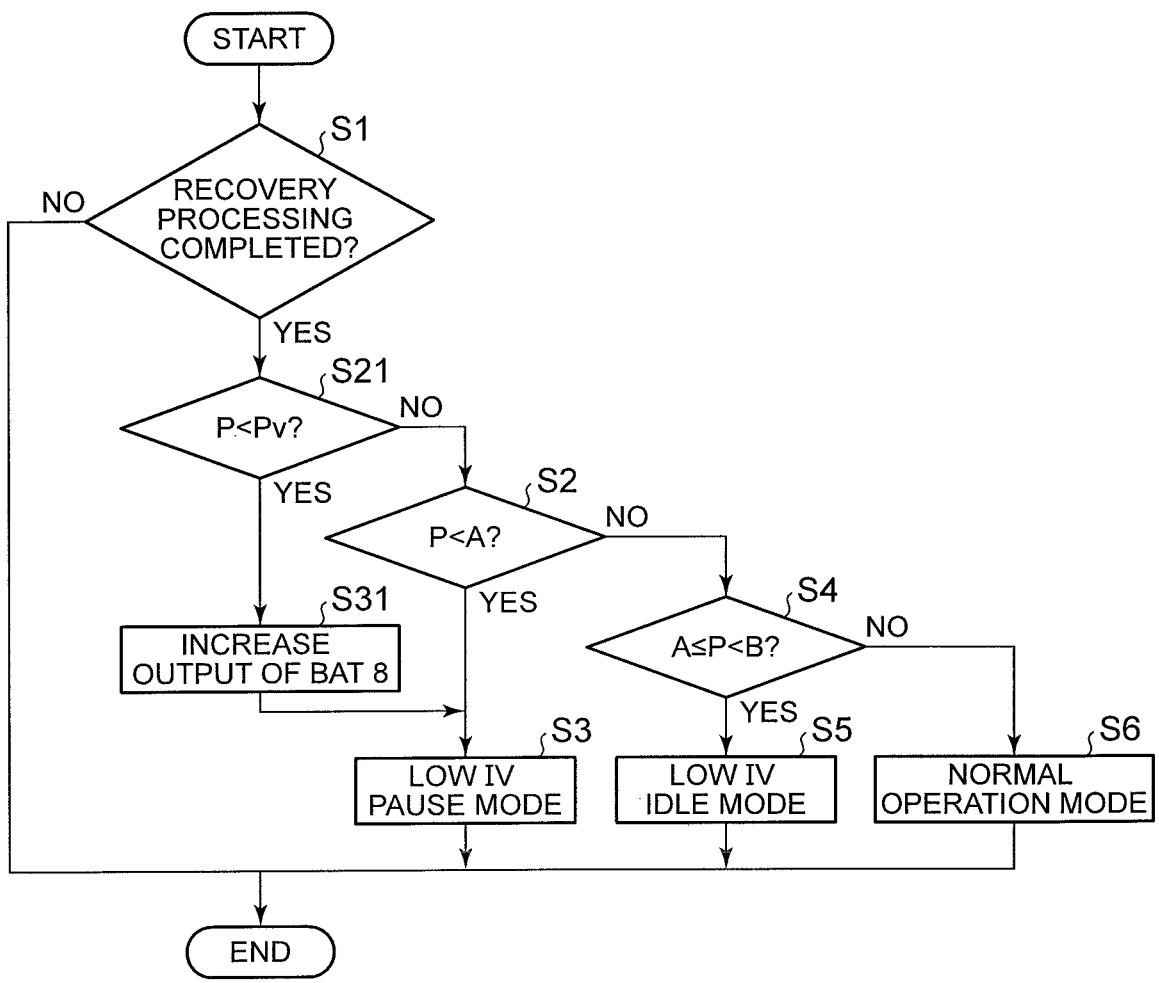
FIG. 5 is an explanatory diagram of operation mode control according to a first modification.

Next, modifications of the operation mode control will be described. FIG. 5 is an explanatory diagram of the operation mode control according to a first modification. In the operation mode control of the modifications, the same processes as those of the above-described operation mode control of the embodiment are denoted by the same reference characters and description thereof will be omitted.

When the recovery processing has been completed (Yes in step S1), the ECU 3 determines whether or not the request output P to the FC 4 is less than an output upper limit value Pv that can be output by the BAT 8 (step S21). The output upper limit value Pv is calculated based on the remaining charge (SOC: State of Charge) of the BAT 8 and the amount of electric power supplied from the BAT 8 to the auxiliary equipment for the vehicle etc., when step S21 is executed.

When the request output P is less than the output upper limit value Pv (Yes in step S21), the ECU 3 controls the BDC 34 to increase the output of the BAT 8 so as to satisfy the request output P (step S31), and controls the FC 4 in the low IV pause mode to pause the power generation of the FC 4 (step S3). When the request output P is equal to or greater than the output upper limit value Pv (No in step S21), the processes of step S2 and subsequent steps are executed in the same manner as in the embodiment. Steps S21, S31, and S3 constitute an example of processing of placing the FC 4 in the power generation paused state and controlling the output of the BAT 8 such that the BAT 8 outputs electric power in an amount corresponding to the request output P, when the BAT 8 is able to output electric power in the amount corresponding to the request output P to the FC 4 at the time when the recovery processing is completed.

Thus, when the remaining charge of the BAT 8 is large and the request output P can be output, the FC 4 is controlled to be in the low IV pause mode to increase the output of the BAT 8, so that it is possible to suppress the voltage of the FC 4 from becoming high after the completion of the recovery processing and to satisfy the request output P. In addition, when the request output P can be output by the BAT 8, the FC 4 is controlled to be in the low IV pause mode so that it is possible to secure many opportunities to pause the power generation of the FC 4. As the cumulative operation time of the FC 4 becomes longer, the FC 4 deteriorates over time and output performance thereof decreases. However, by securing many opportunities to pause the power generation of the FC 4 as in this modification, it is possible to suppress increase in the cumulative operation time of the FC 4 and to suppress deterioration of the FC 4.

In the embodiment and the first modification described above, the FC 4 is controlled to be in the low IV idle mode, but need not necessarily be controlled to be in the low IV idle mode. For example, when the output voltage value of the FC 4 in the idle operation state in the normal operation mode is lower than a voltage at which the catalyst can be eluted, that is, when the average cell voltage is 0.9 V or less, for example, there is no need to implement the low IV idle mode. In this case, step S6 may be executed without executing step S4 described above.

Fuel Cell System of Modifications

Figure 6:
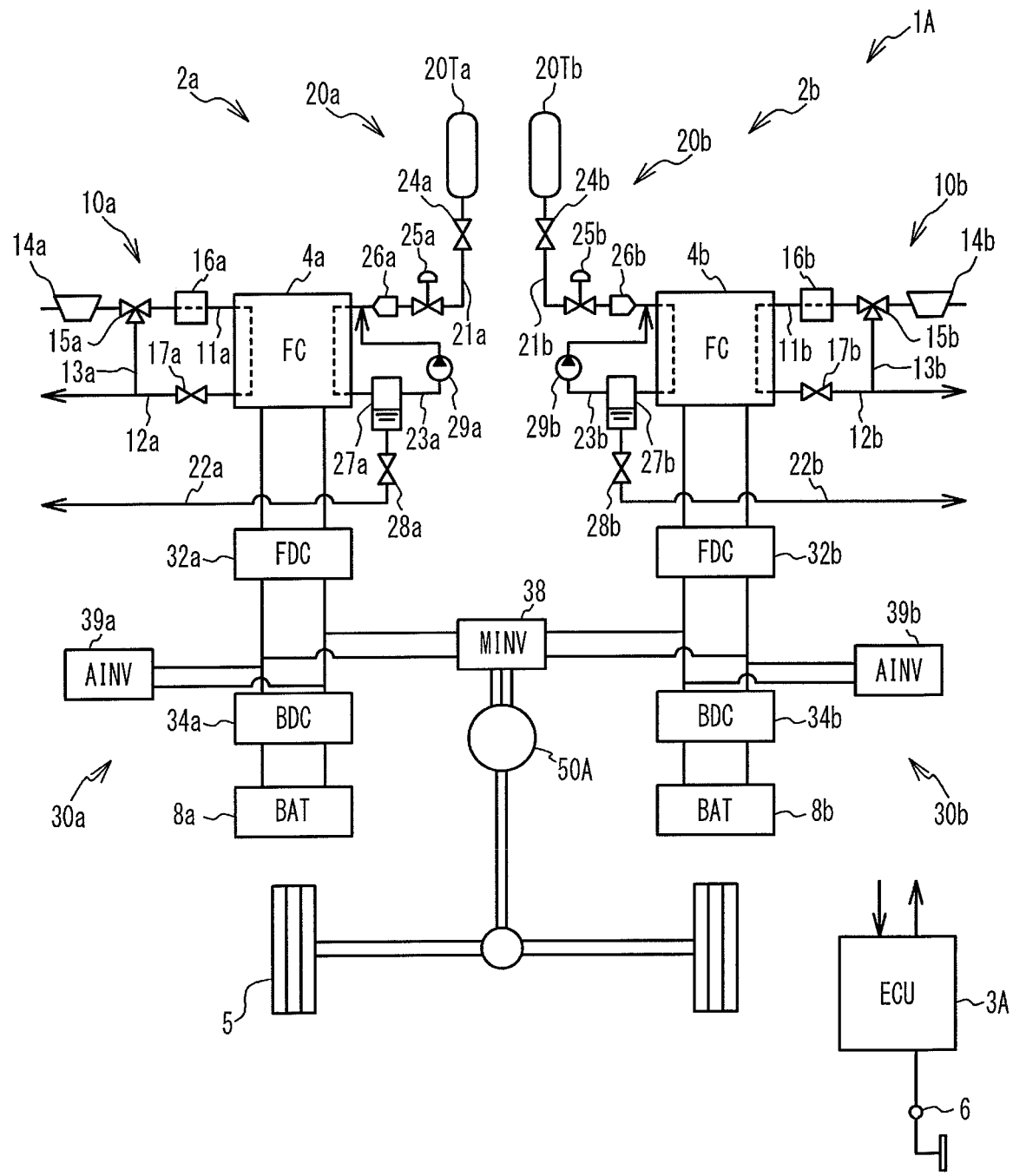
FIG. 6 is a configuration diagram of a fuel cell system of modifications.

Next, a fuel cell system 1A of modifications will be described. Similar structures are denoted by similar reference characters, and description thereof will be omitted. FIG. 6 is a configuration diagram of a fuel cell system 1A of modifications. The fuel cell system 1A includes two control systems (hereinafter simply referred to as systems) 2a and 2b, and an electronic control unit (ECU) 3A. The systems 2a and 2b include FCs 4a and 4b, BATs 8a and 8b, cathode gas supply systems 10a and 10b, anode gas supply systems 20a and 20b, and power control systems 30a and 30b, respectively. The systems 2a and 2b include cooling systems (not shown) that cool the FCs 4a and 4b, respectively, by circulating cooling water. The FCs 4a and 4b are the same fuel cells, and a rated output Ra of the FC 4a and a rated output Rb of the FC 4b are the same, but the present disclosure is not limited thereto. As a vehicle on which the two FCs 4a and 4b are mounted, for example, a large vehicle such as a bus or a truck is conceivable, but the present disclosure is not limited thereto. Note that, the fuel cell system 1A may include three or more control systems each having an FC.

The cathode gas supply systems 10a and 10b are examples of supply devices that supply air containing oxygen as the cathode gas to the FCs 4a and 4b, respectively. Specifically, the cathode gas supply systems 10a and 10b include supply pipes 11a and 11b, discharge pipes 12a and 12b, bypass pipes 13a and 13b, air compressors 14a and 14b, bypass valves 15a and 15b, intercoolers 16a and 16b, and back pressure valves 17a and 17b, respectively.

The anode gas supply systems 20a and 20b include tanks 20Ta and 20Tb, supply pipes 21a and 21b, discharge pipes 22a and 22b, circulation pipes 23a and 23b, tank valves 24a and 24b, pressure regulating valves 25a and 25b, INJs 26a and 26b, gas-liquid separators 27a and 27b, drain valves 28a and 28b, and HPs 29a and 29b, respectively.

The power control systems 30a and 30b include FDCs 32a and 32b, BDCs 34a and 34b, and AINVs 39a and 39b, respectively. The power control systems 30a and 30b share the MINV 38. The FDCs 32a and 32b adjust DC power from the FCs 4a and 4b, respectively, and output the DC power to the MINV 38. The BDCs 34a and 34b adjust DC power from the BATs 8a and 8b, respectively, and output the DC power to the MINV 38. The power generated by the FCs 4a and 4b can be stored in the BATs 8a and 8b, respectively. The MINV 38 converts the input DC power into three-phase AC power and supplies the AC power to a motor 50A. The motor 50A has driving torque and power consumption larger than those of the motor 50 of the embodiment, but the present disclosure is not limited to this.

The ECU 3A is electrically connected with the accelerator opening sensor 6, the air compressors 14a and 14b, the bypass valves 15a and 15b, the back pressure valves 17a and 17b, the tank valves 24a and 24b, the pressure regulating valves 25a and 25b, the INJs 26a and 26b, the drain valves 28a and 28b, the FDCs 32a and 32b, and the BDCs 34a and 34b. The ECU 3A calculates a request output PA to the FC 4a and 4b as a whole, based on the detection value of the accelerator opening sensor 6, the driving states of the auxiliary equipment for the vehicle and the auxiliary equipment for the FCs 4a and 4b, stored power of the BATs 8a and 8b, etc. Moreover, the ECU 3A controls the auxiliary equipment for the FCs 4a and 4b etc. according to the request output PA, and controls the total electric power generation of the FCs 4a and 4b.

Operation Mode Control of Second Modification

Figure 7:
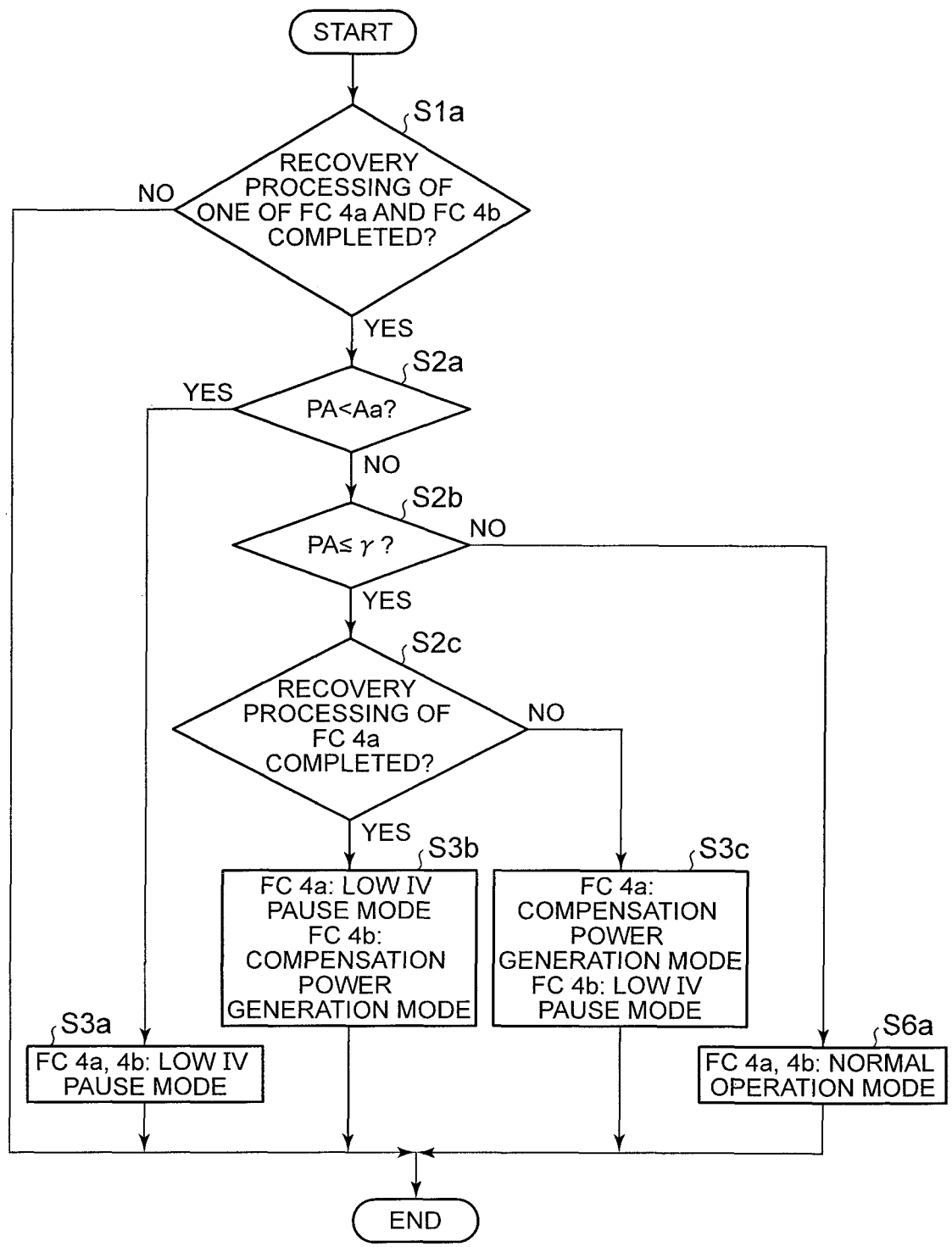
FIG. 7 is a flowchart showing operation mode control of a second modification.

FIG. 7 is a flowchart showing operation mode control of a second modification. The operation mode control of the second modification is based on the premise that the recovery processing of the FCs 4a and 4b is executed at different timings, rather than simultaneously. This is because even when control is performed so that the operation states of the FCs 4a and 4b are always the same, for example, there are cases where variations occur in deterioration of performance of catalysts of the FCs 4a and 4b, and an execution request of the recovery processing is made for one of the FCs 4a and 4b but is not made for the other. The operation mode control of the second modification is based on the premise that the FCs 4a and 4b are the same fuel cells, and the rated output Ra of the FC 4a and the rated output Rb of the FC 4b are the same.

The ECU 3A determines whether or not the recovery processing executed on one of the FCs 4a and 4b has been completed (step S1a). Specifically, the ECU 3A determines whether or not the output voltage of one of the FCs 4a and 4b becomes equal to or less than the target value α during the execution of the recovery processing of the one of the FCs 4a and 4b. In the case of No in step S1a, the control is terminated.

When the recovery processing of one of the FCs 4a and 4b has been completed (Yes in step S1a), the ECU 3A determines whether or not the request output PA is less than a threshold value Aa (step S2a). The case where the request output PA is less than the threshold value Aa is, for example, that the remaining charges of the BATs 8a and 8b are sufficient, the amount of power consumed by the auxiliary equipment for the vehicle is small, and the electric power amount that is consumed by the auxiliary equipment for the vehicle can be sufficiently secured with the charging power of the BATs 8a and 8b. The case is also, for example, that the air conditioner of the vehicle is in a stopped state while the vehicle is in a stopped state, traveling at a reduced speed, traveling on a downhill road, or the like.

When the request output PA is less than the threshold value Aa (Yes in step S2a), the ECU 3A controls both the FCs 4a and 4b in the low IV pause mode (step S3a). As a result, even immediately after the recovery processing of either of the FCs 4a and 4b has been completed, the voltages of both the FCs 4a and 4b are suppressed from becoming high. Thereby, the elution of the catalyst of the FC of which the recovery processing has just been completed can be suppressed.

When the request output PA is equal to or greater than the threshold value Aa (No in step S2a), the ECU 3A determines whether or not the request output PA is equal to or less than a predetermined value γ (step S2b). The predetermined value γ is an output value that can be output only by the FC 4a and can be output only by the FC 4b. That is, in step S2b, the ECU 3A determines whether or not the request output PA can be output by either the FC 4a alone or the FC 4b alone. Specifically, the predetermined value γ is a value obtained by subtracting a predetermined margin value from a value obtained by multiplying a total maximum output Pmax by ½. The total maximum output Pmax is the sum of the maximum outputs of the FCs 4a and 4b. When the maximum outputs of the FCs 4a and 4b are the same, a value obtained by multiplying the total maximum output Pmax by ½ is an output value that can be output by both the FCs 4a and 4b. However, since the actual output performance of the FCs 4a and 4b varies, the value obtained by subtracting the predetermined margin value from the value obtained by multiplying the total maximum output Pmax by ½ is set as the predetermined value γ. The predetermined value γ is a value larger than the threshold value Aa described above.

The total maximum output Pmax is calculated in advance by the ECU 3A as follows, for example. With the FC 4a controlled over a predetermined output range in the normal operation mode, a plurality of actual operating points are stored based on the actual output current value and the actual output voltage value of the FC 4a to estimate IV characteristics of the FC 4a based on the stored operating points. Based on the estimated IV characteristics, an output voltage value corresponding to a predetermined upper limit value of a current that can be swept from the FC 4a is estimated, and a value obtained by multiplying the upper limit value by the estimated output voltage value is determined as the maximum output of the FC 4a. The maximum output of the Fe 4b is calculated by the same method, and the total maximum output Pmax is calculated by adding the maximum output of the FC 4a and the maximum output of the FC 4b.

When the request output PA is equal to or less than the predetermined value γ (Yes in step S2b), the ECU 3A determines whether or not the recovery processing of the FC 4a has been completed, that is, whether or not it is the FC 4a of which the recovery processing is completed (step S2c).

When it is the FC 4a of which the recovery processing is completed (Yes in step S2c), the ECU 3A controls the FC 4a of which the recovery processing is completed in the low IV pause mode, and controls the FC 4b of which the recovery processing is not completed in a compensation power generation mode (step S3b). When the FC 4b is switched to be in the compensation power generation mode, the output of the FC 4b is controlled so as to compensate for the shortage of the generated power due to the pause of the power generation of the FC 4a. Thereby, the request output PA is satisfied by the FC 4b, while an increase in the voltage of the FC 4a of which the recovery processing is completed can be suppressed. Thus, the elution of the catalyst of the FC 4a can be suppressed.

When it is the FC 4b of which the recovery processing is completed (No in step S2c), the ECU 3A controls the FC 4a of which the recovery processing is not completed in the compensation power generation mode, and controls the FC 4b of which the recovery processing is completed in the low IV pause mode (step S3c). Thereby, an increase in the voltage of the FC 4b of which the recovery processing is completed can be suppressed while the request output PA is satisfied by the FC 4a. Thus, the elution of the catalyst of the FC 4b can be suppressed. Steps S2b, S2c, S3b, and S3c constitute an example of processing of placing one FC among the plurality of the FCs for which the recovery processing has just been completed in the power generation paused state and controlling an output of the rest of the plurality of the FCs such that the rest of the plurality of the FCs outputs electric power in an amount corresponding to a request total output to the plurality of the FCs, when electric power in the amount corresponding to the request total output to the plurality of the FCs at the time when the recovery processing for the one FC is completed is able to be output from the rest of the plurality of the FCs. The rest of the plurality of the FCs is an FC or FCs other than the one FC for which the recovery processing has just been completed, among the plurality of the FCs. The request total output to the plurality of the FCs is a total amount of electric power that the plurality of the FCs is requested to output as a whole.

When the request output PA is greater than the predetermined value γ (No in step S2b), the ECU 3A controls both the FCs 4a and 4b in the normal operation mode (step S6a). That is, when the request output PA is large, the normal operation is performed in both the FCs 4a and 4b so as to satisfy the large request output PA. In this case, one of the FCs of which the recovery processing is completed also generates relatively large electric power. Thus, it is possible to suppress the voltage of the one of the FCs from being controlled to be high after the completion of the recovery processing.

Figure 8:
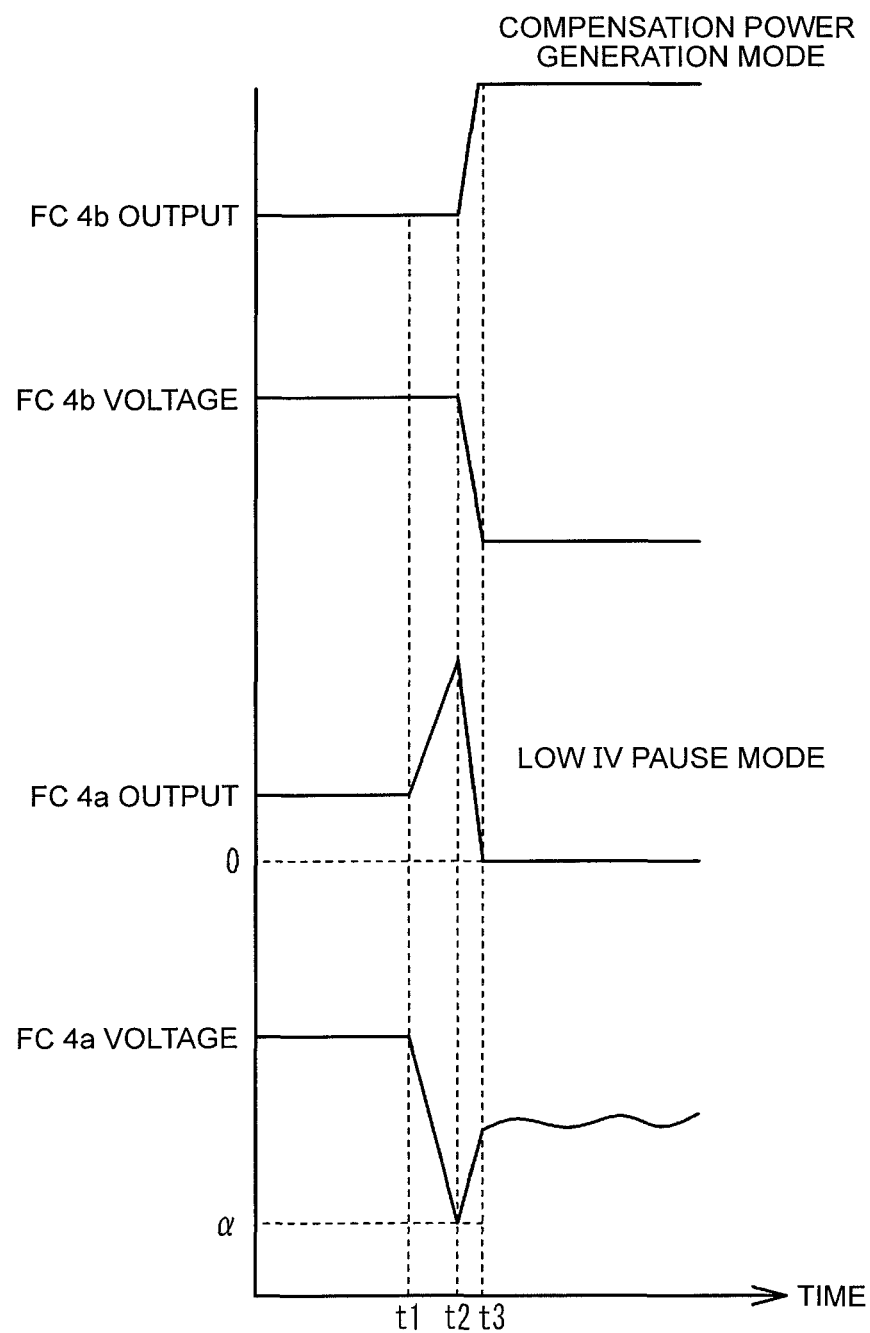
FIG. 8 is a timing chart showing the operation mode control of the second modification.

FIG. 8 is a timing chart showing the operation mode control of the second modification. FIG. 8 shows the respective outputs, voltages, and transitions thereof of the FCs 4a and 4b, and shows a case where the recovery processing is executed for the FC 4a. When the recovery processing of the FC 4a is completed (time t2), in the case of Yes in steps S2b and S2c, the FCs 4a and 4b are controlled to be in the low IV pause mode and the compensation power generation mode, respectively, and the output of the FC 4b starts increasing and the voltage of the FC 4b starts decreasing (time t3). Since the output of the FC 4b is increased, the request output can be satisfied even if the power generation of the FC 4a is paused.

Note that the control in step S6a is not limited to controlling the outputs of the FCs 4a and 4b to the same. For example, the outputs of the FCs 4a and 4b may be controlled such that the output of one the FCs 4a and 4b, of which the recovery processing is completed, is larger than that of the other, in order to satisfy the request output PA. Thereby, the voltage of one of the FCs 4a and 4b, of which the recovery processing is completed, can be suppressed from becoming high while the request output PA is satisfied. Thus, the elution of the catalyst of the one of the FCs 4a and 4b, of which the recovery processing is completed, can be suppressed. When one of the FCs 4a and 4b is controlled to be in the low IV idle mode but the output of the other can satisfy the request output PA, one of the FCs 4a and 4b, of which the recovery processing is completed, may be controlled to be in the low IV idle mode and the other may be controlled to be in the normal operation mode.

Since the rated outputs Ra and Rb of the FCs 4a and 4b are the same, the predetermined value γ in step S2b may be a value obtained by subtracting a predetermined margin value from the rated output, for example. It is preferable that the margin value be determined in consideration of variation, deterioration, etc. of the actual output performance of the FCs 4a and 4b.

In step S2b, for example, in a system including n FCs (n≥3) with the same rated output, when the sum of the maximum outputs of n FCs is Pnmax, the predetermined value γ may be set to a value obtained by subtracting a predetermined margin value from $\{(n-1)/n\} \times Pnmax$. Thus, in the system having three or more FCs, it is possible to determine whether or not the request output can be satisfied by the FCs other than the FC of which the recovery processing has just been completed. When the determination is affirmative, the FC of which the recovery processing has just been completed is controlled to be in the low IV pause mode while the request output is satisfied by the FCs other than the FC of which the recovery processing has just been completed. Thereby, it is possible to suppress the voltage of the FC of which the recovery processing has just been completed from becoming high.

Operation Mode Control of Third Modification

Figure 9:
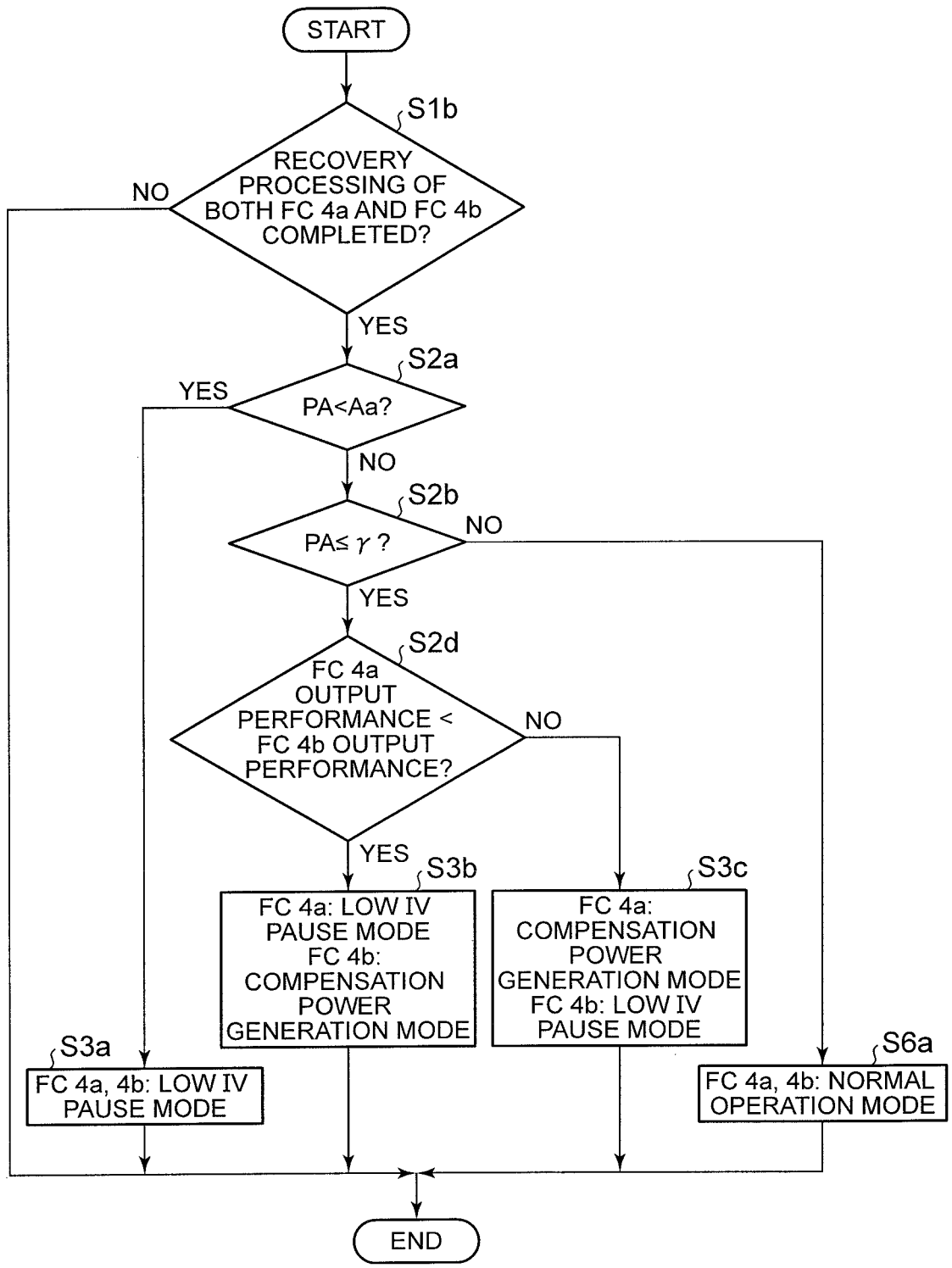
FIG. 9 is a flowchart showing operation mode control of a third modification.

FIG. 9 is a flowchart showing the operation mode control of a third modification. The operation mode control of the third modification is based on the premise that the recovery processing of the FCs 4a and 4b is executed at the same timing. For example, when an execution request for the recovery processing is made for only one of the FCs 4a and 4b, the recovery processing is performed for both the FCs 4a and 4b. The operation mode control of the third modification is based on the premise that the FCs 4a and 4b are the same fuel cells.

The ECU 3A determines whether or not the recovery processing that has been executed for both the FCs 4a and 4b is completed (step S1b). Specifically, the ECU 3A determines whether or not the output voltage of each of the FCs 4a and 4b becomes equal to or less than the target value α during the execution of the recovery processing of the FCs 4a and 4b. When an execution request for the recovery processing is made for neither the FC 4a nor 4b, or the recovery processing is being executed but not completed (No in step S1b), this control is terminated.

When the recovery processing of both the FCs 4a and 4b is completed (Yes in step S1b), the request output PA is equal to or greater than the threshold value Aa (No in step S2a), and the request output PA is equal to or less than the predetermined value γ (Yes in step S2b), the ECU 3A determines whether or not the output performance of the FC 4a is lower than that of the FC 4b (step S2d).

The ECU 3A acquires the output performance of the FCs 4a and 4b in advance as follows. When both the FCs 4a and 4b are in a high output state, the sweep current values thereof are the same, and other operation conditions thereof are also the same, for a predetermined period or longer, the ECU 3A stores the output voltage values of FCs 4a and 4b. The stored voltage value is used as an index indicating the output performance. The ECU 3A determines that the FC having the lower stored voltage value has more deteriorated output performance. Here, both the FCs 4a and 4b are in a high output state for a predetermined period or longer so that the voltage decreases and the amount of generated water increases. Therefore, it is possible to suppress reversible deterioration of performance due to drying and poisonous substances, oxide films, etc. adhering to the catalyst in the FCs 4a and 4b. Therefore, the voltage value thus stored reflects the degree of irreversible deterioration of performance due to deterioration over time of the FCs 4a and 4b. The case where the operation conditions of the FCs 4a and 4b are the same is, for example, that the flow rates of the cathode gas supplied to the FCs 4a and 4b are controlled to be the same and the flow rates of the anode gas supplied to the FCs 4a and 4b are controlled to be the same, and thus a pressure difference between the circulation pipes 23a and 23b is equal to or less than a predetermined value and the pressures in the circulation pipes 23a and 23b can be regarded as substantially the same. The method of acquiring the output performance of the FCs 4a and 4b is not limited to the above.

When the output performance of the FC 4a is lower than that of the FC 4b (Yes in step S2d), the ECU 3A controls the FC 4a having lowered output performance in the low IV pause mode and controls the FC 4b in the compensation power generation mode (step S3b). When the output performance of the FC 4b is lower than that of the FC 4a (No in step S2d), the ECU 3A controls the FC 4a in the compensation power generation mode and controls the FC 4b having lowered output performance in the low IV pause mode (step S3c). Thereby, the power generation of the FC having lowered output performance is paused so that increase in the cumulative operation time can be suppressed. Thus, it is possible to suppress further deterioration over time of the FC having lowered output performance. In addition, the FC having high output performance generates power, so that the FC with high power generation efficiency generates power, which improves fuel efficiency. Steps S2b, S2d, S3b, and S3c constitute an example of processing of placing a lowest-output-performance FC in the power generation paused state, and controlling an output of the plurality of the FCs other than the lowest-output-performance FC such that the plurality of the FCs other than the lowest-output-performance fuel cell outputs electric power in an amount corresponding to a request total output to the plurality of the FCs, when electric power in the amount corresponding to the request total output to the plurality of the FCs at the time when the recovery processing of all of the plurality of the FCs is completed is able to be output from the plurality of the FCs other than the lowest-output-performance FC. The lowest-output-performance FC is included in the plurality of the FCs and has lowest output performance among the plurality of the FCs.

Figure 10:
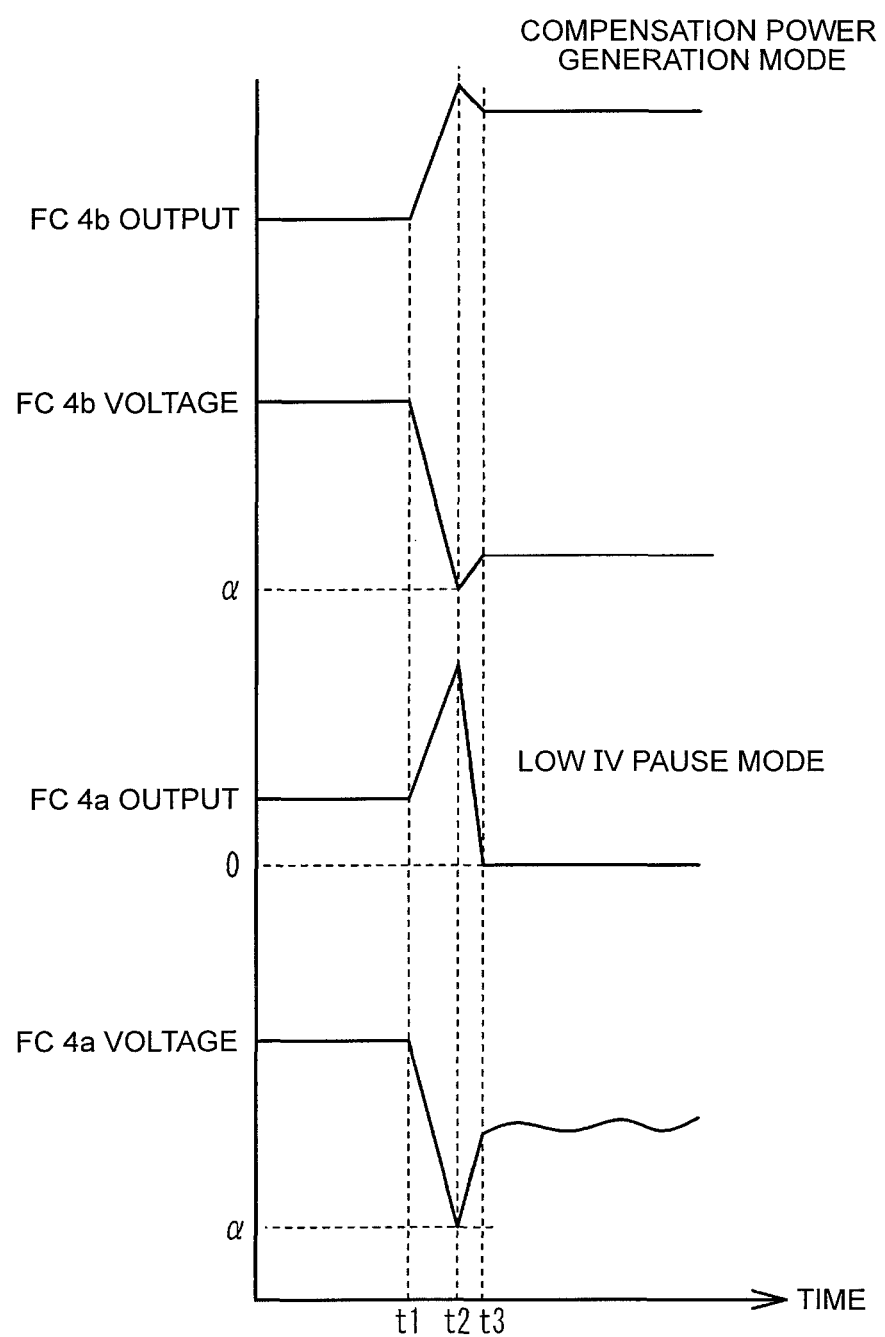
FIG. 10 is a timing chart showing the operation mode control of the third modification.

FIG. 10 is a timing chart showing the operation mode control of the third modification. FIG. 10 shows the respective outputs, voltages, and transitions thereof of the FCs 4a and 4b, and shows a case where the recovery processing is executed for both the FCs 4a and 4b and the output performance of the FC 4a is lower than that of the FC 4b. When the voltages of both the FCs 4a and 4b become equal to or lower than the target value α, the recovery processing is completed (time t2), the power generation of the FC 4a having lowered output performance is paused, and the output of the FC 4b having high output performance is increased.

When both the case where the recovery processing of the FCs 4a and 4b is executed at different timings and the case where the recovery processing of the FCs 4a and 4b is executed at the same timing are possible, the following operation mode control may be executed. The ECU 3A determines whether or not the recovery processing of only one of the FCs 4a and 4b is completed. When the determination is affirmative, the processes of step S2a and subsequent steps shown in FIG. 7 are executed. When the determination is negative, the ECU 3A determines whether or not the recovery processing of both the FCs 4a and 4b is completed. When the recovery processing of both the FCs 4a and 4b has not been completed, this control is terminated. When the recovery processing of both the FCs 4a and 4b is completed, the processes of step S2a and subsequent steps shown in FIG. 9 may be executed.

For example, when three or more FCs having the same rated output are provided, in steps S2d, S3b, and S3c, only the FC having the most lowered output performance may be controlled to be in the low IV pause mode, and the remaining FCs may be controlled to be in the compensation power generation mode.

Operation Mode Control of Fourth Modification

The operation mode control of a fourth modification will be described. The operation mode control of the fourth modification is based on the premise that the recovery processing of the FCs 4a and 4b is executed at different timings, and further, the FCs 4a and 4b are different fuel cells and have different rated outputs Ra and Rb, and a maximum output Pamax of the FC 4a and a maximum output Pbmax of the FC 4b are also different.

Figure 11:
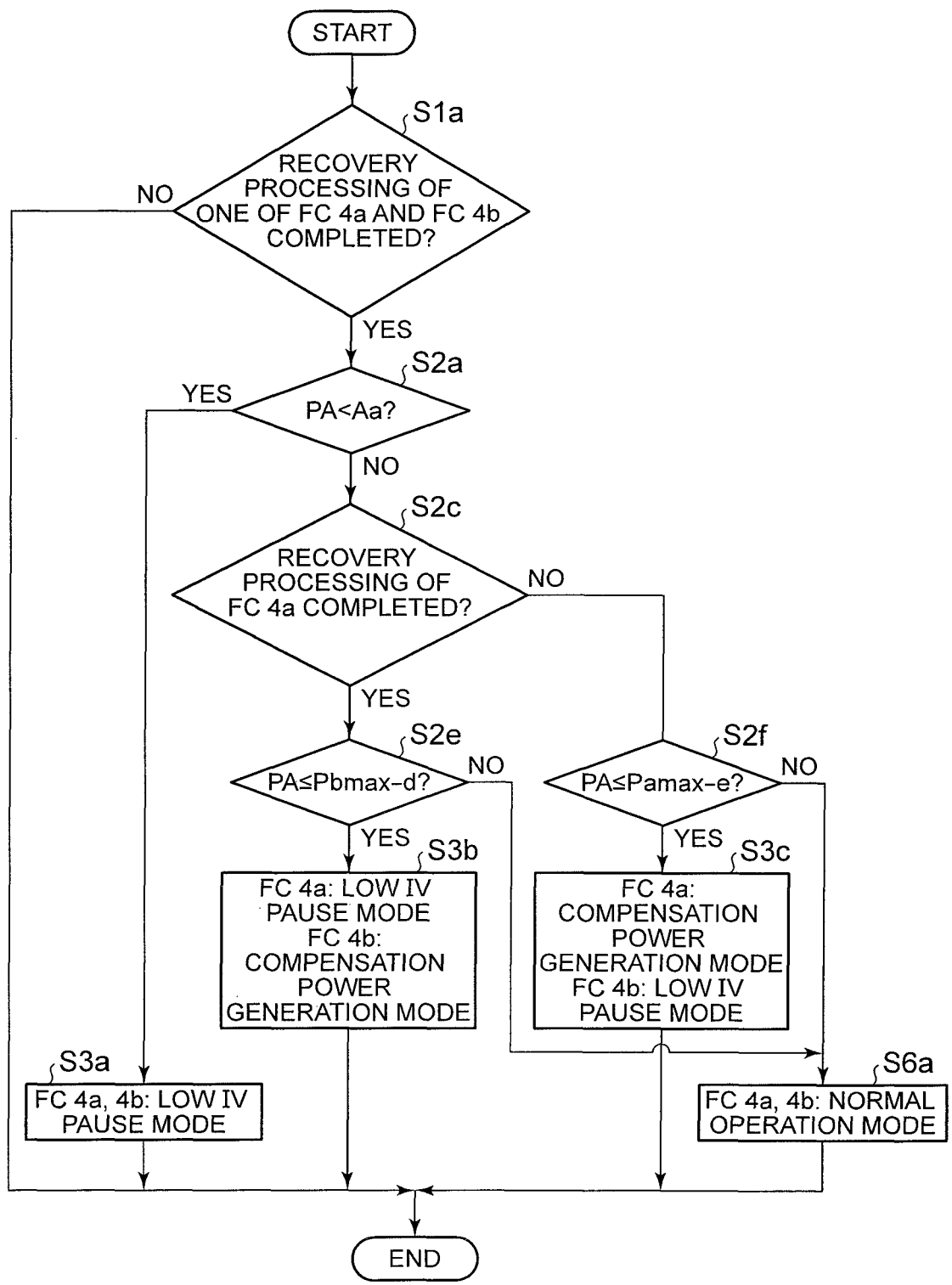
FIG. 11 is a flowchart showing operation mode control of a fourth modification.

FIG. 11 is a flowchart showing the operation mode control of the fourth modification. When the recovery processing of one of the FCs 4a and 4b is completed (Yes in step S1a), the request output PA is equal to or greater than the threshold value Aa (No in step S2a), and the recovery processing of the FC 4a is completed (Yes in step S2c), the ECU 3A determines whether or not the request output PA is equal to or less than a value obtained by subtracting a predetermined margin value d from the maximum output Pbmax of the FC 4b (step S2e). Step S2e is a process of determining whether or not the request output PA at the time when the recovery processing of the FC 4a is completed can be output only by the FC 4b.

The maximum output Pbmax of the FC 4b is calculated in advance by the ECU 3A as follows, for example. With the FC 4b controlled over a predetermined output range in the normal operation mode, a plurality of actual operating points are stored based on the actual output current value and the actual output voltage value of the FC 4b to estimate IV characteristics of the FC 4b based on the stored operating points. Based on the estimated IV characteristics, an output voltage value corresponding to a predetermined maximum value of a current that can be swept from the FC 4b is estimated, and a value obtained by multiplying the value of the current that can be swept by the estimated output voltage value is determined as the maximum output Pbmax of the FC 4b.

When the request output PA is equal to or less than a value obtained by subtracting the margin value d from the maximum output Pbmax (Yes in step S2e), the FC 4a is controlled to be in the low IV pause mode, and the FC 4b is controlled to be in the compensation power generation mode (step S3b). When the request output PA is greater than the value obtained by subtracting the margin value d from the maximum output Pbmax (No in step S2e), both the FCs 4a and 4b are controlled to be in the normal operation mode (step S6a). That is, when the request output PA at the time when the recovery processing of the FC 4a is completed can be output only by the FC 4b, the output of the FC 4b is increased to satisfy the request output PA while the power generation of the FC 4a is paused.

When the recovery processing of the FC 4b is completed (No in step S2c), the ECU 3A determines whether or not the request output PA is equal to or less than a value obtained by subtracting a predetermined margin value e from the maximum output Pamax of the FC 4a (step S2f). Step S2f is a process of determining whether or not the request output PA at the time when the recovery processing of the FC 4b is completed can be output only by the FC 4a. The ECU 3A acquires in advance the maximum output Pamax of the FC 4a by the same method as in the case of the maximum output Pbmax of the FC 4b.

When the request output PA is equal to or less than the value obtained by subtracting the predetermined margin value e from the maximum output Pamax (Yes in step S2f), the FC 4a is controlled to be in the compensation power generation mode, and the FC 4b is controlled to be in the low IV pause mode (step S3c). When the request output PA is larger than the value obtained by subtracting the margin value e from the maximum output Pamax (No in step S2f), both the FCs 4a and 4b are controlled to be in the normal operation mode (step S6a). That is, when the request output PA at the time when the recovery processing of the FC 4b is completed can be output only by the FC 4a, the output of the FC 4a is increased to satisfy the request output PA while the power generation of the FC 4b is paused. Steps S2c, S2e, S2f, S3b, and S3c constitute an example of processing of placing one FC among the plurality of the FCs for which the recovery processing has just been completed in the power generation paused state and controlling an output of the rest of the plurality of the FCs such that the rest of the plurality of the FCs outputs electric power in an amount corresponding to a request total output to the plurality of the FCs, when electric power in the amount corresponding to the request total output to the plurality of the FCs at the time when the recovery processing for the one FC is completed is able to be output from the rest of the plurality of the FCs.

As described above, even when the rated outputs Ra and Rb of the FCs 4a and 4b are different and the maximum outputs Pamax and Pbmax of the FCs 4a and 4b are also different, it is possible to suppress the voltage of the FC of which the recovery processing has just been completed from becoming high and to suppress the elution of the catalyst.

When the rated outputs Ra and Rb are different, the control in step S6a is not limited to controlling the ratio of the actual output of the FC 4a to the rated output Ra and the ratio of the actual output of the FC 4b to the rated output Rb to be the same. For example, in step S6a after the recovery processing of the FC 4a is completed and it is determined as No in step S2e, the ratio of the actual output of the FC 4a to the rated output Ra may be set larger than the ratio of the actual output of the FC 4b to the rated output Rb, and the outputs of the FCs 4a and 4b may be controlled so that the total output of the FCs 4a and 4b satisfies the request output PA. In step S6a after the recovery processing of the FC 4b is completed and it is determined as No in step S2f, the ratio of the actual output of the FC 4b to the rated output Rb may be set larger than the ratio of the actual output of the FC 4a to the rated output Ra, and the outputs of the FCs 4a and 4b may be controlled so that the total output of the FCs 4a and 4b satisfies the request output PA. Thereby, the output of one of the FCs 4a and 4b, of which the recovery processing is completed, is increased and the voltage of the one of the FCs 4a and 4b is suppressed from becoming high, while the request output PA is satisfied. Thus, the elution of the catalyst of the one of the FCs 4a and 4b can be suppressed.

Operation Mode Control of Fifth Modification

The operation mode control of a fifth modification will be described. The operation mode control of the fifth modification is based on the premise that the recovery processing of the FCs 4a and 4b is executed at the same timing, and the rated outputs Ra and Rb of the FCs 4a and 4b are different, and the maximum output Pamax of the FC 4a and the maximum output Pbmax of the FC 4b are different.

Figure 12:
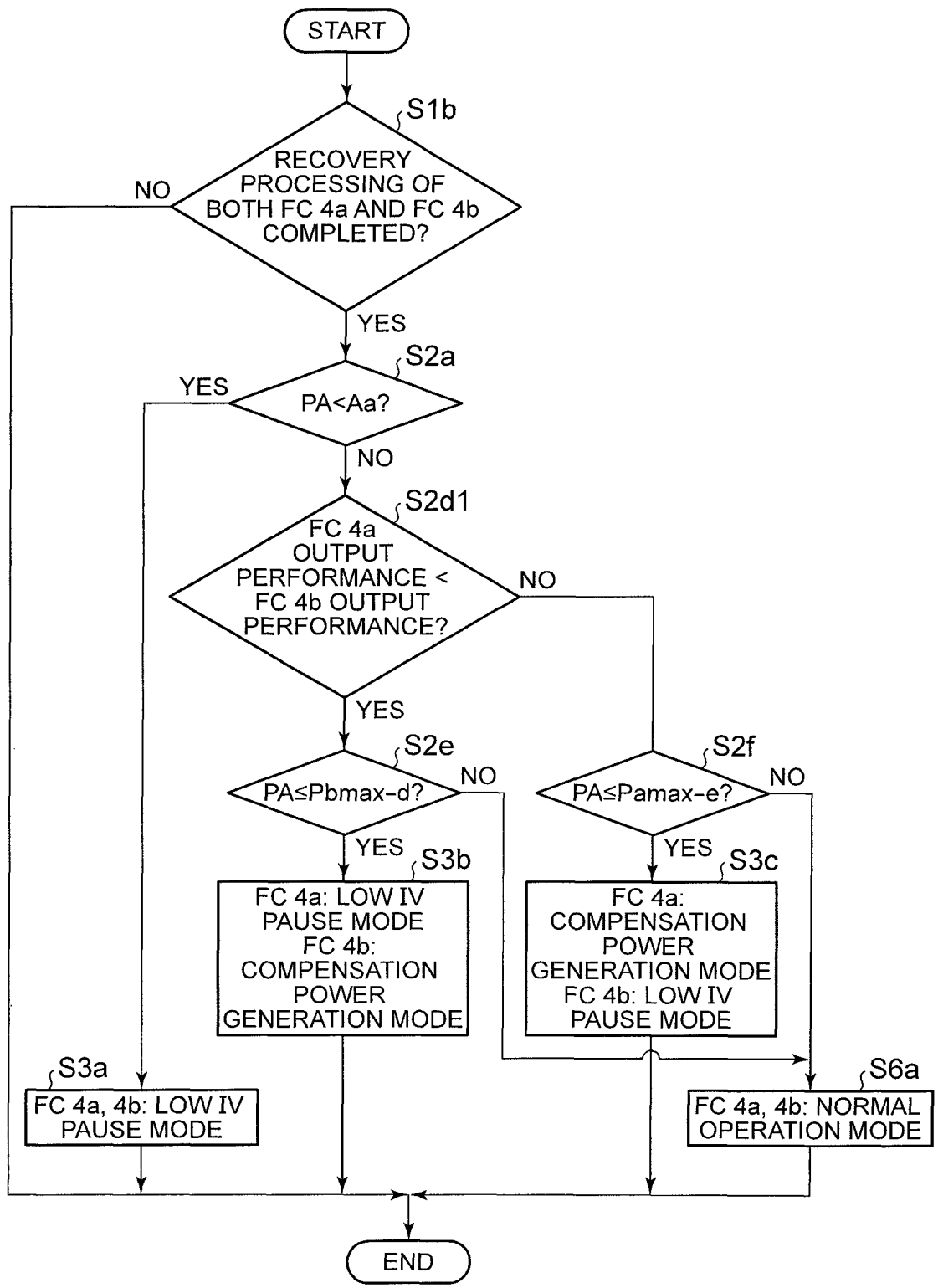
FIG. 12 is a flowchart showing operation mode control of a fifth modification.

FIG. 12 is a flowchart showing the operation mode control of the fifth modification. When the recovery processing of both the FCs 4a and 4b is completed (Yes in step S1b) and the request output PA is equal to or greater than the threshold value Aa (No in step S2a), the ECU 3A determines whether or not the output performance of the FC 4a is lower than that of the FC 4b (step S2d1).

Since the rated outputs Ra and Rb of the FCs 4a and 4b are different from each other, the determination in step S2d1 is specifically performed as follows. The output performance of the FCs 4a and 4b is calculated by the same method as in step S2d described above. Next, the ratio of the output performance of the FC 4a to the rated output Ra of the FC 4a is calculated, and the ratio of the output performance of the FC 4b to the rated output Rb of the FC 4b is calculated. The ECU 3A determines that the FC having the smaller ratio has output performance lower than that of the other FC.

When the output performance of the FC 4a is lower than that of the FC 4b (Yes in step S2d1), and the request output PA is equal to or less than the value obtained by subtracting the margin value d from the maximum output Pbmax (Yes in step S2e), the FC 4a is controlled to be in the low IV pause mode and the FC 4b is controlled to be in the compensation power generation mode (step S3b). When the request output PA is larger than the value obtained by subtracting the margin value d from the maximum output Pbmax (No in step S2e), the FCs 4a and 4b are controlled to be in the normal operation mode (step S6a). In other words, when the output performance of the FC 4a is lower than that of the FC 4b and the request output PA can be output only by the FC 4b, the output of the FC 4b is increased to satisfy the request output PA while the power generation of the FC 4a is paused.

When the output performance of the FC 4b is lower than that of the FC 4a (No in step S2d1), and the request output PA is equal to or less than the value obtained by subtracting the margin value e from the maximum output Pamax (Yes in step S2f), the FC 4a is controlled to be in the compensation power generation mode, and the FC 4b is controlled to be in the low IV pause mode (step S3c). When the request output PA is larger than the value obtained by subtracting the margin value e from the maximum output Pamax (No in step S2f), both the FCs 4a and 4b are controlled to be in the normal operation mode (step S6a). In other words, when the output performance of the FC 4b is lower than that of the FC 4a and the request output PA can be output only by the FC 4a, the output of the FC 4a is increased to satisfy the request output PA while the power generation of the FC 4b is paused. Steps S2d1, S2e, S2f, S3b, and S3c constitute an example of processing of placing a lowest-output-performance FC in the power generation paused state, and controlling an output of the plurality of the FCs other than the lowest-output-performance FC such that the plurality of the FCs other than the lowest-output-performance fuel cell outputs electric power in an amount corresponding to a request total output to the plurality of the FCs, when electric power in the amount corresponding to the request total output to the plurality of the FCs at the time when the recovery processing of all of the plurality of the FCs is completed is able to be output from the plurality of the FCs other than the lowest-output-performance FC.

When both the case where the recovery processing of the FCs 4a and 4b is executed at different timings and the case where the recovery processing of the FCs 4a and 4b is executed at the same timing are possible, the following operation mode control may be executed. That is, the ECU 3A determines whether or not the recovery processing of only one of the FCs 4a and 4b is completed. When the determination is affirmative, the processes of step S2a and subsequent steps shown in FIG. 11 are executed. When the determination is negative, the ECU 3A determines whether or not the recovery processing of both the FCs 4a and 4b is completed. When the recovery processing of both the FCs 4a and 4b has not been completed, this control is terminated.

When the recovery processing of both the FCs 4a and 4b is completed, the processes of step S2a and the subsequent steps shown in FIG. 12 may be executed.

Although the preferred embodiments of the present disclosure have been described in detail above, the present disclosure is not limited to such specific embodiments, and various modifications and changes can be made within the scope of the gist of the present disclosure as set forth in the claims.

What is claimed is:

1. A fuel cell system comprising:
a fuel cell;
a supply device configured to supply a cathode gas to the fuel cell; and
a control unit programmed to execute recovery processing of causing a catalyst of the fuel cell to recover from performance deterioration by lowering an output voltage of the fuel cell,
wherein the control unit is programmed to, when the recovery processing that has been executed is completed, control the supply device to place the fuel cell in a power generation paused state while making a stoichiometric ratio of the cathode gas lower than a stoichiometric ratio of the cathode gas in a normal operation state that is a state before execution of the recovery processing.

2. The fuel cell system according to claim 1, wherein the control unit is programmed to control the supply device to make an open circuit voltage of the fuel cell in the power generation paused state lower than an output voltage of the fuel cell in an idle operation state in the normal operation state.

3. The fuel cell system according to claim 2, wherein the control unit is programmed to control the supply device to regulate a flow rate of the cathode gas to be supplied to the fuel cell such that the open circuit voltage of the fuel cell is kept within a predetermined target range.

4. The fuel cell system according to claim 1, wherein:
the fuel cell includes a plurality of single cells that are stacked; and
the control unit is programmed to control the supply device to control an open circuit voltage of the fuel cell in the power generation paused state such that an average cell voltage is equal to or lower than 0.9 V.

5. The fuel cell system according to claim 1, wherein the control unit is programmed to
i) place the fuel cell in the power generation paused state while making the stoichiometric ratio of the cathode gas lower than the stoichiometric ratio of the cathode gas in the normal operation state, when a request output to the fuel cell at a time when the recovery processing is completed is less than a first threshold value, and
ii) place the fuel cell in an idle operation state while making a stoichiometric ratio of the cathode gas lower than the stoichiometric ratio of the cathode gas in the normal operation state, when the request output at the time when the recovery processing is completed is equal to or greater than the first threshold value and less than a second threshold value that is greater than the first threshold value.

6. The fuel cell system according to claim 1, further comprising:
a secondary battery,
wherein the control unit is programmed to place the fuel cell in the power generation paused state and control an output of the secondary battery such that the secondary battery outputs electric power in an amount corresponding to a request output to the fuel cell, when the secondary battery is able to output electric power in the amount corresponding to the request output to the fuel cell at a time when the recovery processing is completed.

7. The fuel cell system according to claim 1, wherein:
the fuel cell system includes a plurality of the fuel cells;
the supply device is configured to supply the cathode gas to the plurality of the fuel cells; and
the control unit is programmed to, when electric power in an amount corresponding to a request total output to the plurality of the fuel cells at a time when the recovery processing for one fuel cell among the plurality of the fuel cells is completed is able to be output from the rest of the plurality of the fuel cells, place the one fuel cell for which the recovery processing has just been completed in the power generation paused state, and control an output of the rest of the plurality of the fuel cells such that the rest of the plurality of the fuel cells outputs electric power in the amount corresponding to the request total output to the plurality of the fuel cells.

8. The fuel cell system according to claim 1, wherein:
the fuel cell system includes a plurality of the fuel cells;
the supply device is configured to supply the cathode gas to the plurality of the fuel cells; and
the control unit is programmed to, when electric power in an amount corresponding to a request total output to the plurality of the fuel cells at a time when the recovery processing of all of the plurality of the fuel cells is completed is able to be output from the plurality of the fuel cells other than a lowest-output-performance fuel cell that is included in the plurality of the fuel cells and that has lowest output performance among the plurality of the fuel cells, place the lowest-output-performance fuel cell in the power generation paused state, and control an output of the plurality of the fuel cells other than the lowest-output-performance fuel cell such that the plurality of the fuel cells other than the lowest-output-performance fuel cell outputs electric power in the amount corresponding to the request total output to the plurality of the fuel cells.

9. A fuel cell system comprising:
a fuel cell;
a supply device configured to supply a cathode gas to the fuel cell; and
a control unit programmed to execute recovery processing of causing a catalyst of the fuel cell to recover from performance deterioration by lowering an output voltage of the fuel cell,
wherein the control unit is programmed to, when the recovery processing that has been executed is completed, control the supply device to place the fuel cell in an idle operation state while making a stoichiometric ratio of the cathode gas lower than a stoichiometric ratio of the cathode gas in a normal operation state that is a state before execution of the recovery processing.

* * * * *